United States Patent
Lance et al.

(10) Patent No.: US 6,438,310 B1
(45) Date of Patent: Aug. 20, 2002

(54) CABLE MANAGEMENT PANEL WITH SLIDING DRAWER

(75) Inventors: Paul C. Lance, Brooklyn Park; Trevor D. Smith, St. Louis Park; John C. Holman, Coon Rapids, all of MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/490,379

(22) Filed: Jan. 24, 2000

(51) Int. Cl.[7] .............................. G02B 6/00; G02B 6/36
(52) U.S. Cl. ........................................................ 385/135
(58) Field of Search .................................. 385/134–137

(56) References Cited

U.S. PATENT DOCUMENTS

| | | | |
|---|---|---|---|
| 4,373,776 A | 2/1983 | Purdy ........................ 385/135 |
| 4,792,203 A | 12/1988 | Nelson et al. .............. 385/135 |
| 4,820,007 A | 4/1989 | Ross et al. .................. 385/135 |
| 4,840,449 A | 6/1989 | Ghandeharizadeh ........ 385/135 |
| 4,898,448 A | * 2/1990 | Cooper ...................... 385/135 |
| 4,995,688 A | 2/1991 | Anton et al. ................. 385/53 |
| 5,066,149 A | * 11/1991 | Wheeler et al. ............ 385/135 |
| 5,142,607 A | * 8/1992 | Petrotta et al. ............. 385/135 |
| 5,240,209 A | 8/1993 | Kutsch ........................ 248/49 |
| 5,247,603 A | 9/1993 | Vidacovich et al. ....... 385/135 |
| 5,323,480 A | 6/1994 | Mullaney et al. .......... 385/135 |
| 5,339,379 A | * 8/1994 | Kutsch et al. .............. 385/135 |
| 5,363,466 A | * 11/1994 | Milanowski et al. ....... 385/135 |
| 5,497,444 A | 3/1996 | Wheeler ..................... 385/135 |
| 5,640,481 A | * 6/1997 | Llewellyn et al. .......... 385/134 |
| 5,802,237 A | 9/1998 | Pulido ........................ 385/135 |
| 5,887,106 A | * 3/1999 | Cheeseman et al. ........ 385/135 |
| 5,917,984 A | * 6/1999 | Roseler et al. .............. 385/135 |
| 5,946,440 A | 8/1999 | Puetz .......................... 385/135 |
| 6,009,224 A | * 12/1999 | Allen .......................... 385/135 |
| 6,226,436 B1 | * 5/2001 | Daoud et al. ............... 385/135 |

FOREIGN PATENT DOCUMENTS

| | | |
|---|---|---|
| WO | WO95/07480 | 3/1995 |
| WO | WO96/10203 | 4/1996 |

* cited by examiner

*Primary Examiner*—Akm E. Ullah
*Assistant Examiner*—Michelle R. Connelly
(74) *Attorney, Agent, or Firm*—Merchant & Gould P.C.

(57) ABSTRACT

An optical fiber cable management panel is provided with slideable drawers and structure within the drawers for cable management and/or connection to other devices. Tray inserts drop into the drawers to provide the appropriate management and connection devices. A take-up mechanism manages the cable entering and exiting the drawers at side openings. The take-up mechanism is held stationary when the drawer is moved furthest from the chassis. As the drawer is moved toward the closed position, the take-up mechanism begins to move with the drawer. Stackable pivoting storage trays on the tray insert include a detent arrangement for holding each tray in a pivoted access position. The tray inserts further include a front key, and a back tab mounting arrangement for mounting the tray inserts to the drawers, and side radius limiters including notches for extending over raised portions of the drawer.

33 Claims, 31 Drawing Sheets

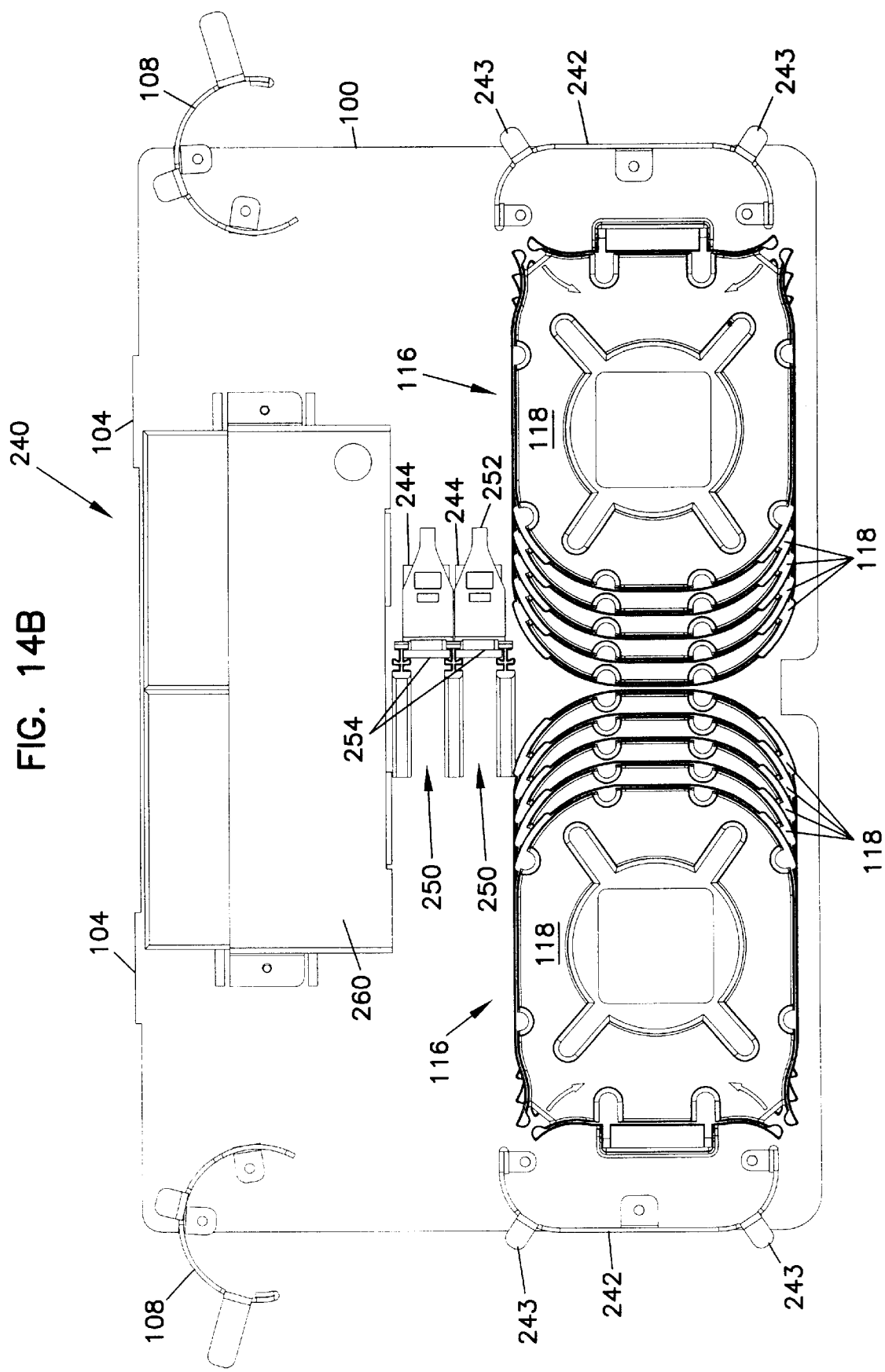

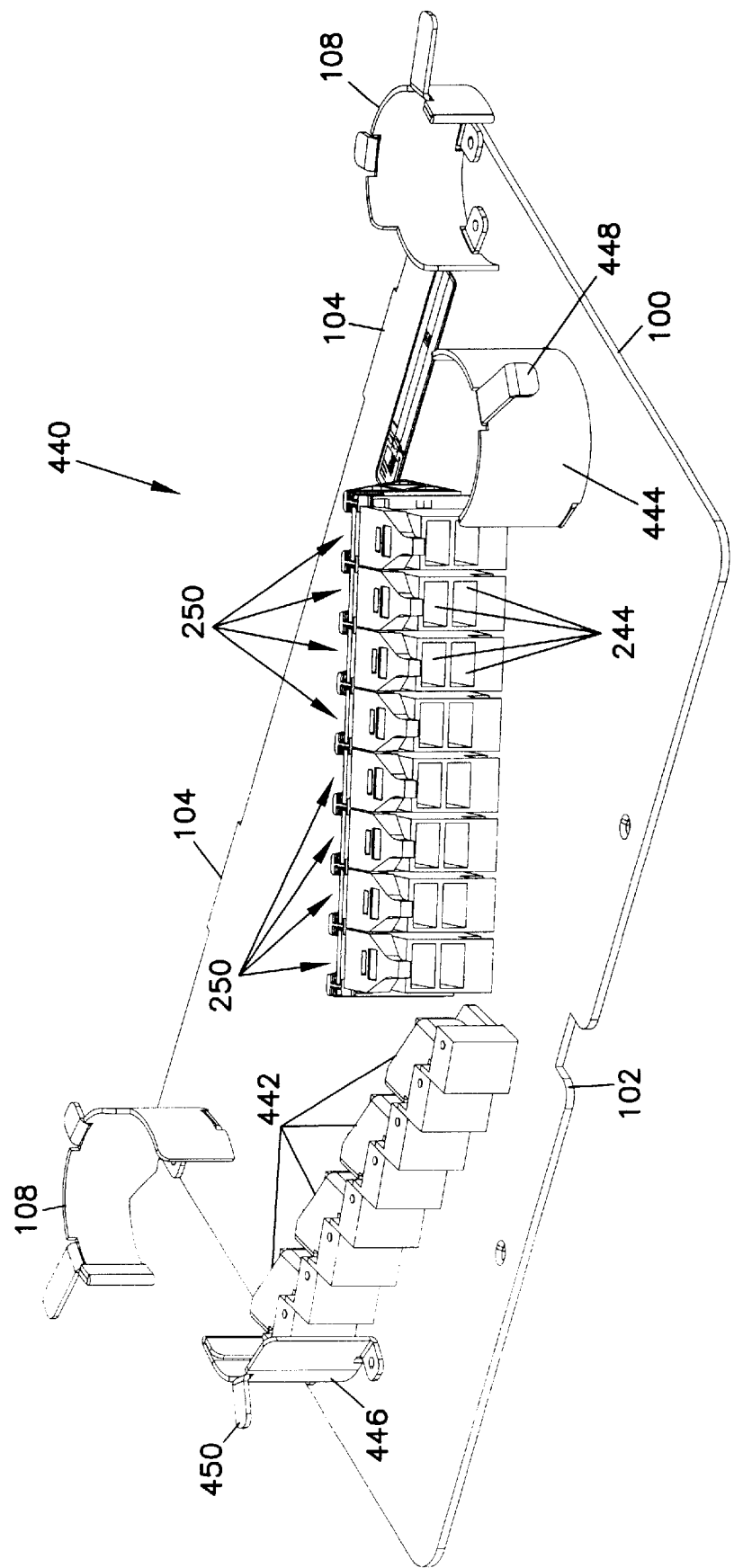

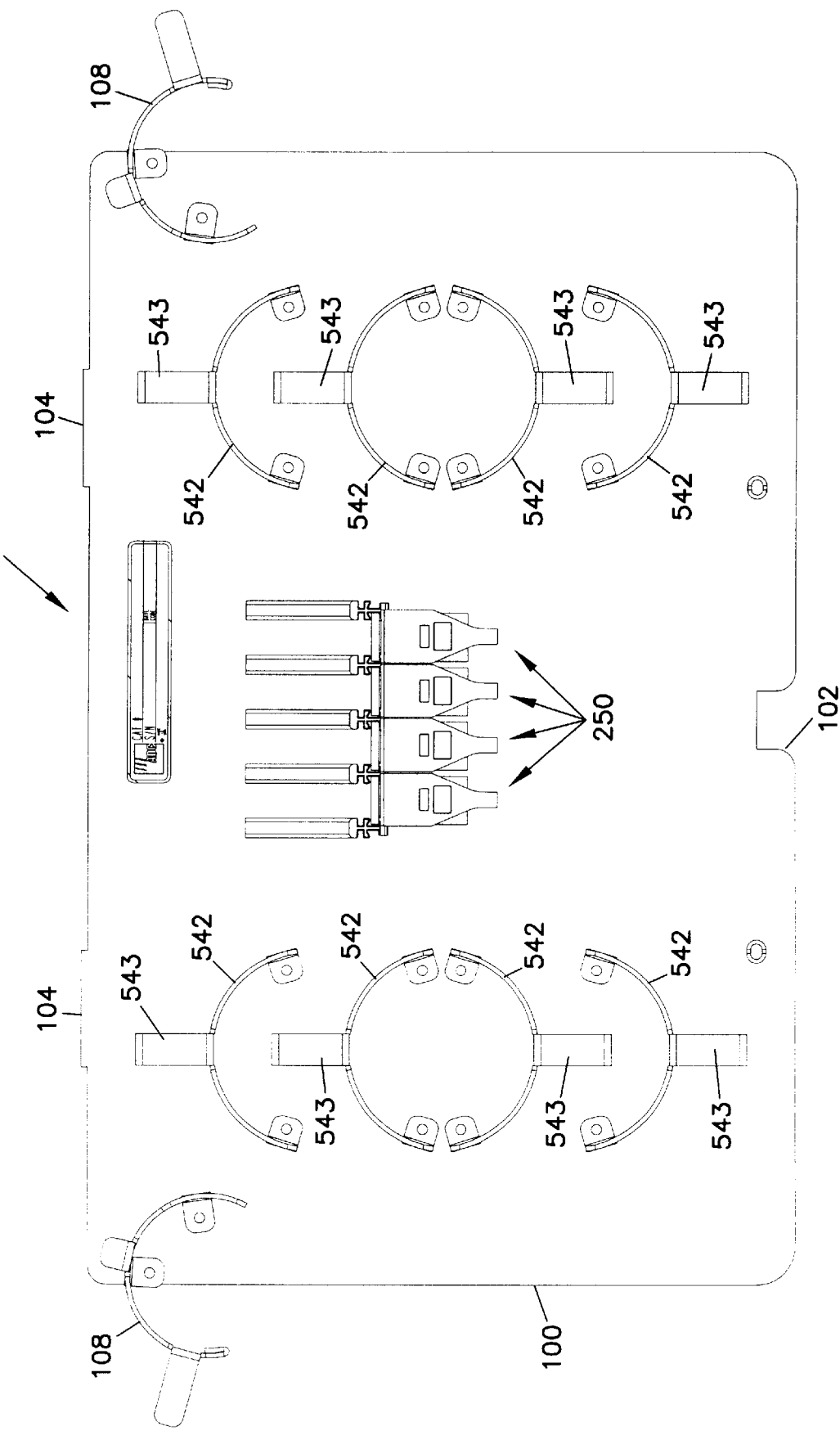

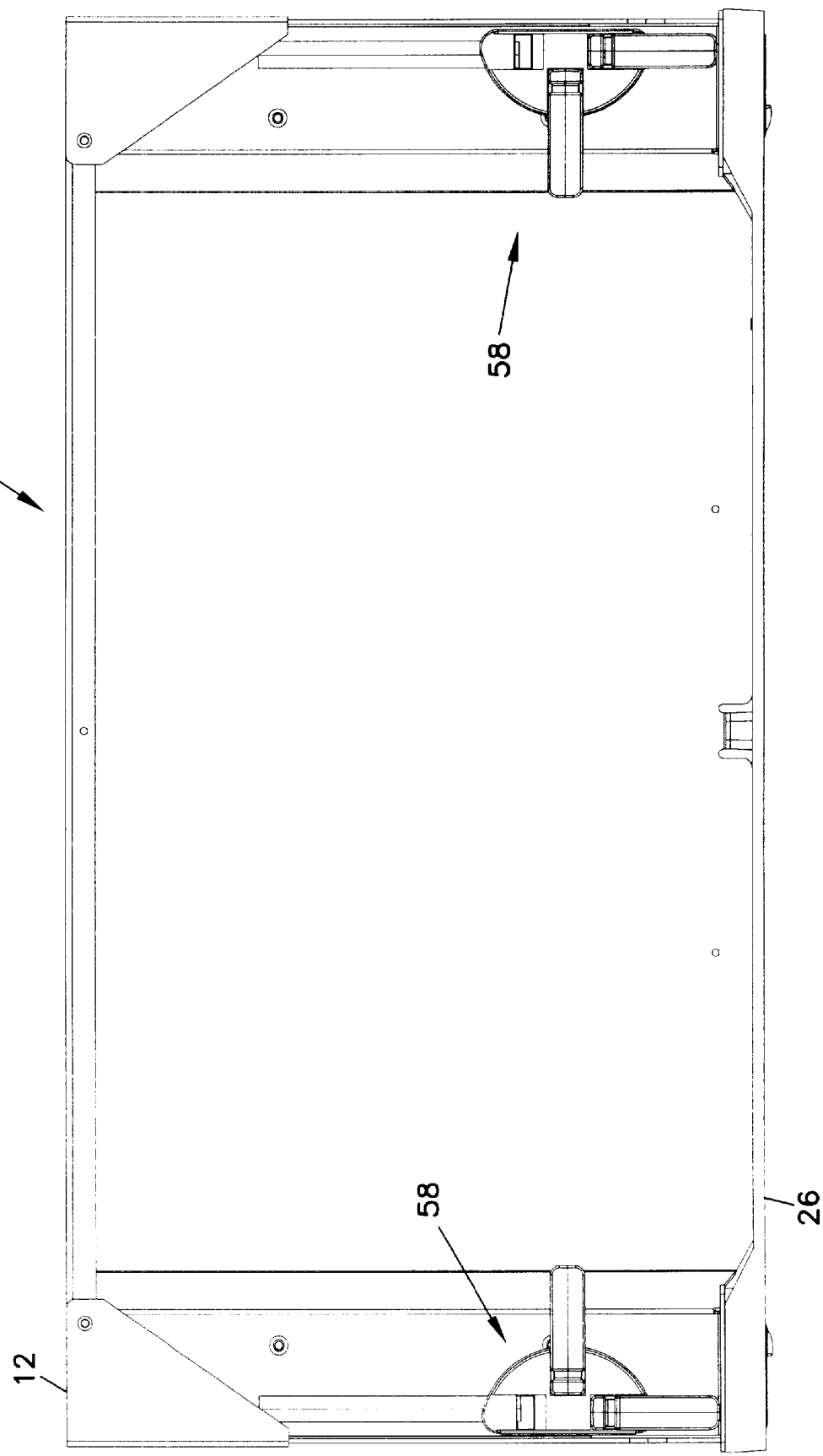

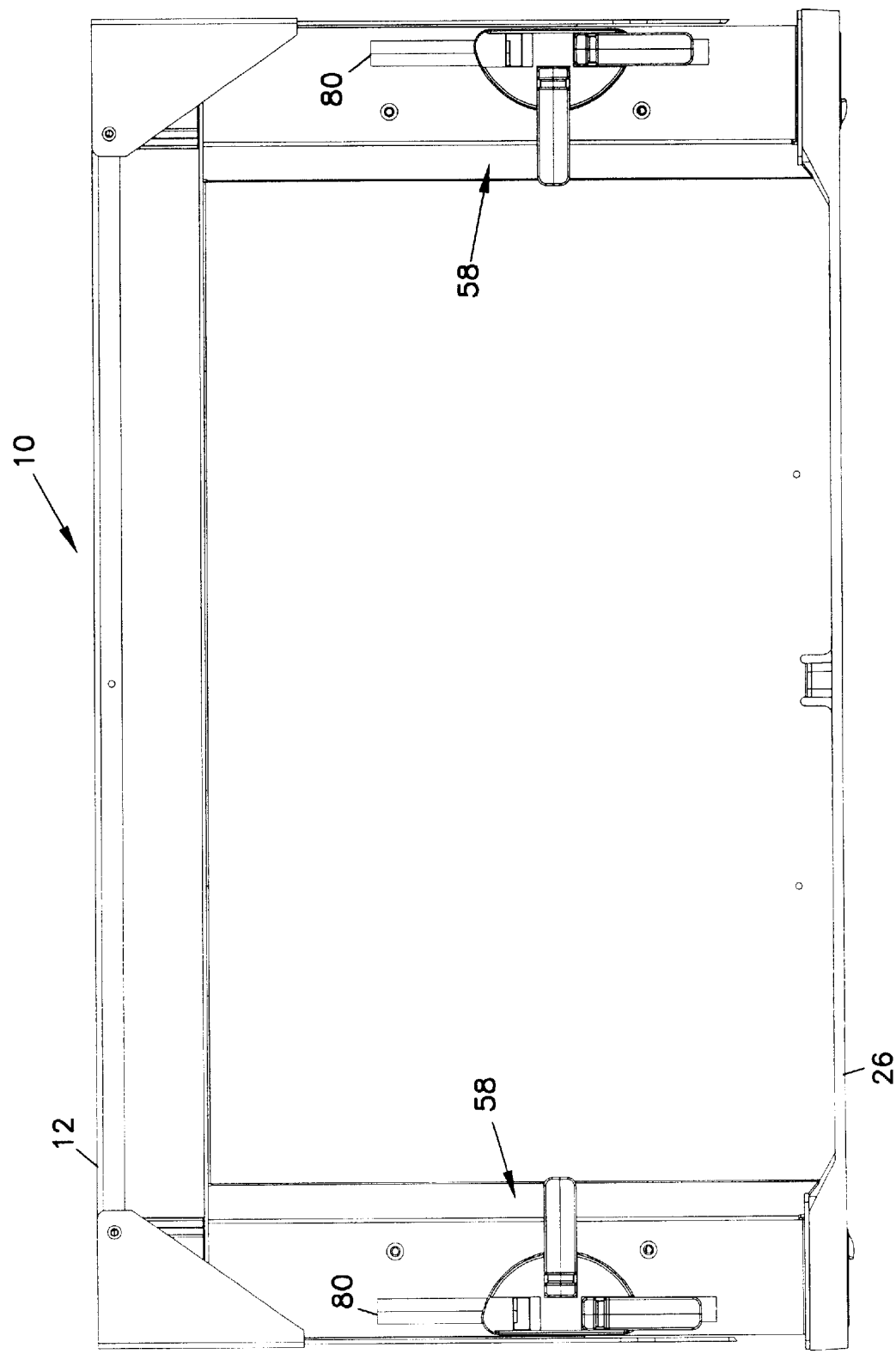

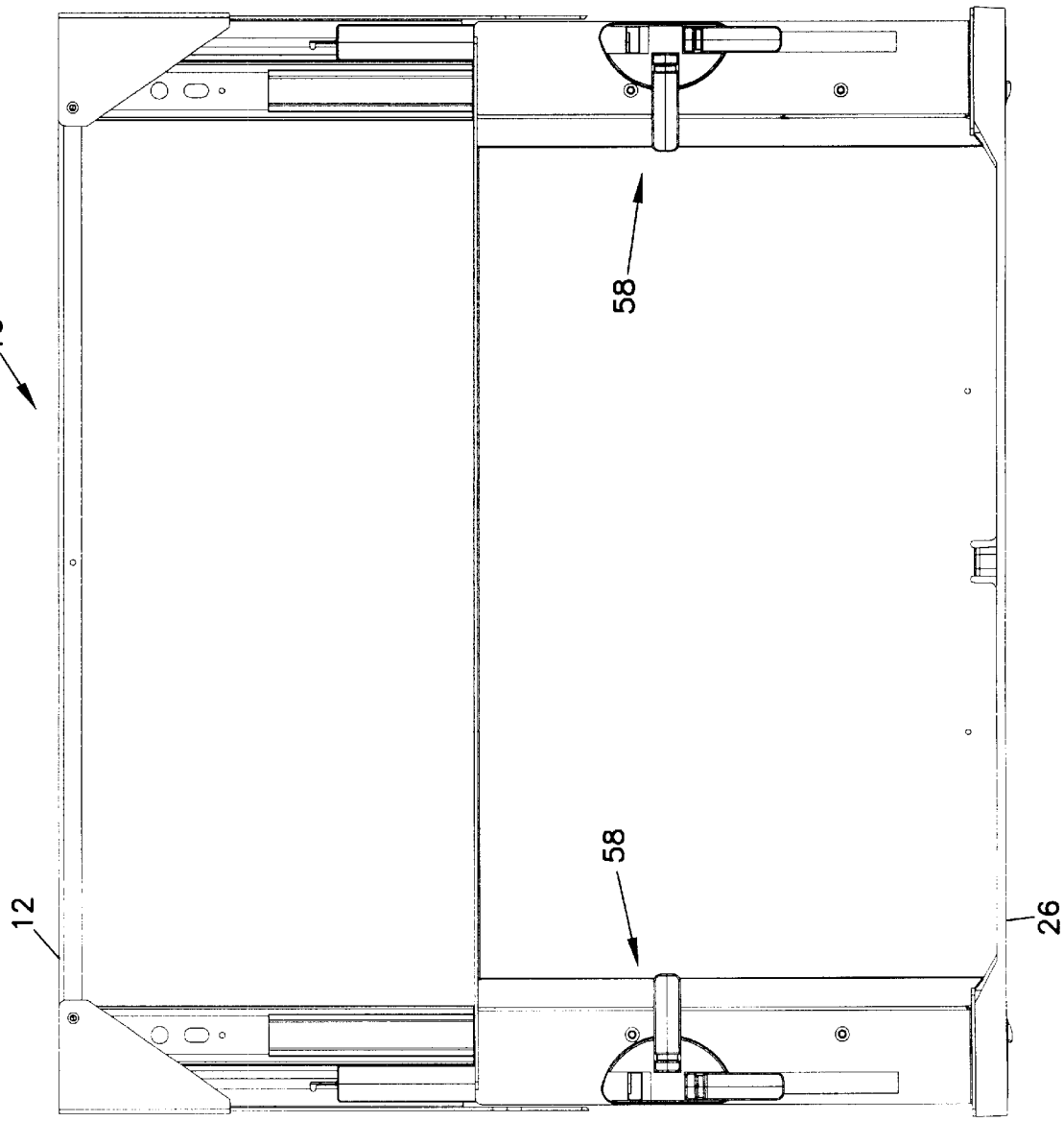

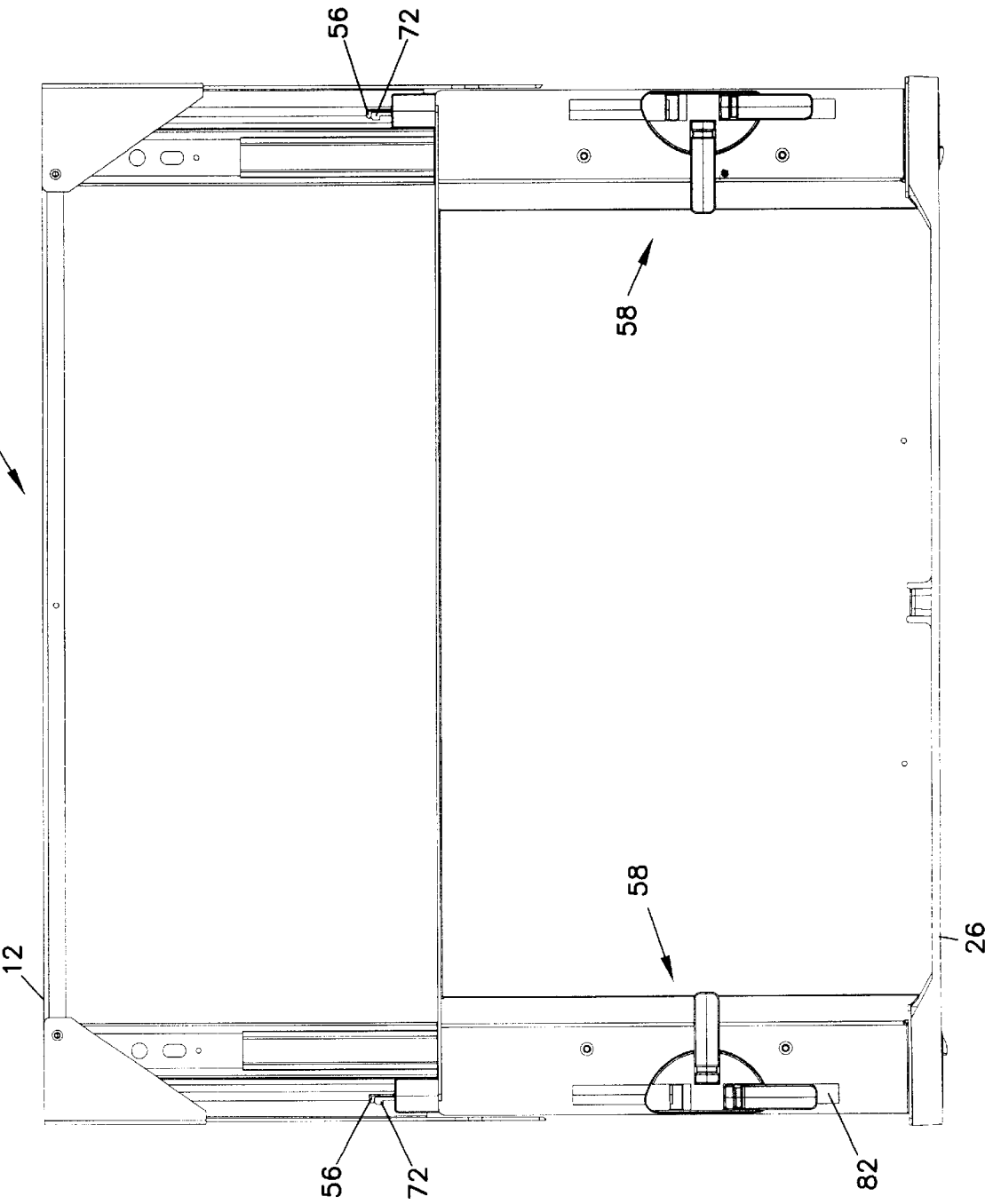

CABLE MANAGEMENT PANEL WITH SLIDING DRAWER

FIELD OF THE INVENTION

The present invention is concerned with management of optical fiber cables. The management device of the present invention has particular application in the telecommunications industry with respect to storage and/or connection of optical fiber cables with other cables and devices.

BACKGROUND OF THE INVENTION

Cable termination, splice and storage devices are known including, for example, devices shown in U.S. Pat. Nos. 4,792,203 and 5,946,440, both issued to ADC Telecommunications, Inc. Both of these patents concern devices with moveable trays for storage and management of the optical fiber cables. U.S. Pat. No. 5,066,149, also issued to ADC Telecommunications, Inc., concerns a cable management device including slideable drawers each including a cable slack take-up mechanism.

When moving the trays or drawers, unnecessary or excessive displacement of the optical fiber cables is undesirable. As the optical fiber cables are displaced, they are subject to bending and other forces. Bending of the fibers can cause attenuation and loss of signal strength. As a fiber bends, the fiber can also break, resulting in a loss of transmission through the fiber.

There is a continued need in the art for further cable management devices which address such concerns in the telecommunications industry as ease of use, size, reliability, cost, and protection of the fibers.

SUMMARY OF THE INVENTION

A cable management panel includes a chassis, and at least one drawer slideably mounted within the chassis. The drawer is slideable between a first position with the drawer fully inserted within the chassis and a second position with the drawer extended from the interior of the chassis. An access location allows entry and exit of optical fiber cables into a side of the chassis and the drawer. One aspect of the present invention includes a fiber take-up mechanism including a push member slideably mounted on the drawer and further slideably mounted relative to the chassis. The push member is moveable from a first position on the drawer toward a second position on the drawer which is forward of the first position as the drawer is moved from the second position to the first position. A retention member holds the push member relative to the chassis for a portion of movement of the drawer from the second position toward the first position. The retention member releases the push member at an intermediate position so as to allow the push member to move relative to the chassis as the drawer is moved from the intermediate position to the first position.

A further aspect of the present invention concerns the drawer including a front key and a rear slot, and providing a drop-in plate including a notch along a front edge, and a tab along a rear edge where the notch is engageable with the key of the drawer, and the tab is engageable with the slot of the drawer. The drop-in plate includes cable storage or cable connection structure for cables entering the panel.

Another aspect of the present invention includes the drawer having a base and raised side ledges on opposite sides of the drawer, and further including a drop-in plate including a base and two side edges which are positioned adjacent to the side ledges of the drawer. The plate includes two radius limiters, each radius limiter having a portion extending beyond the respective side edges of the base of the plate. Each radius limiter has a notch along a lower edge, the notch extending from each respective side edge of the base of the plate to the side ledge of the drawer.

A further aspect of the present invention concerns a storage tray mount on the drawer having opposed staggered mounting locations, and a plurality of storage trays rotatably mounted to the storage tray mount. The trays and tray mount include a post and hole arrangement for rotatably mounting the trays to the tray mount. One of the trays and the tray mount includes a projection, and the other includes a notch wherein the projection is received in the notch when the tray is pivoted upwardly from a first horizontal position to a second pivoted position at an angle to the horizontal.

BRIEF DESCRIPTION OF THE DRAWINGS

FIGS. 18A–E show the drawer in various positions during opening from the closed position of FIG. 18A through the nearly completely open position of FIG. 18E, the completely open position being shown in FIG. 2; and FIGS. 19A–D show the drawer in various positions during closing from the completely open position of FIG. 2 through the nearly completely closed position of FIG. 19D, just prior to being placed in the fully closed position of FIG. 18A.

DETAILED DESCRIPTION OF THE PREFERRED EMBODIMENTS

Figure 1:
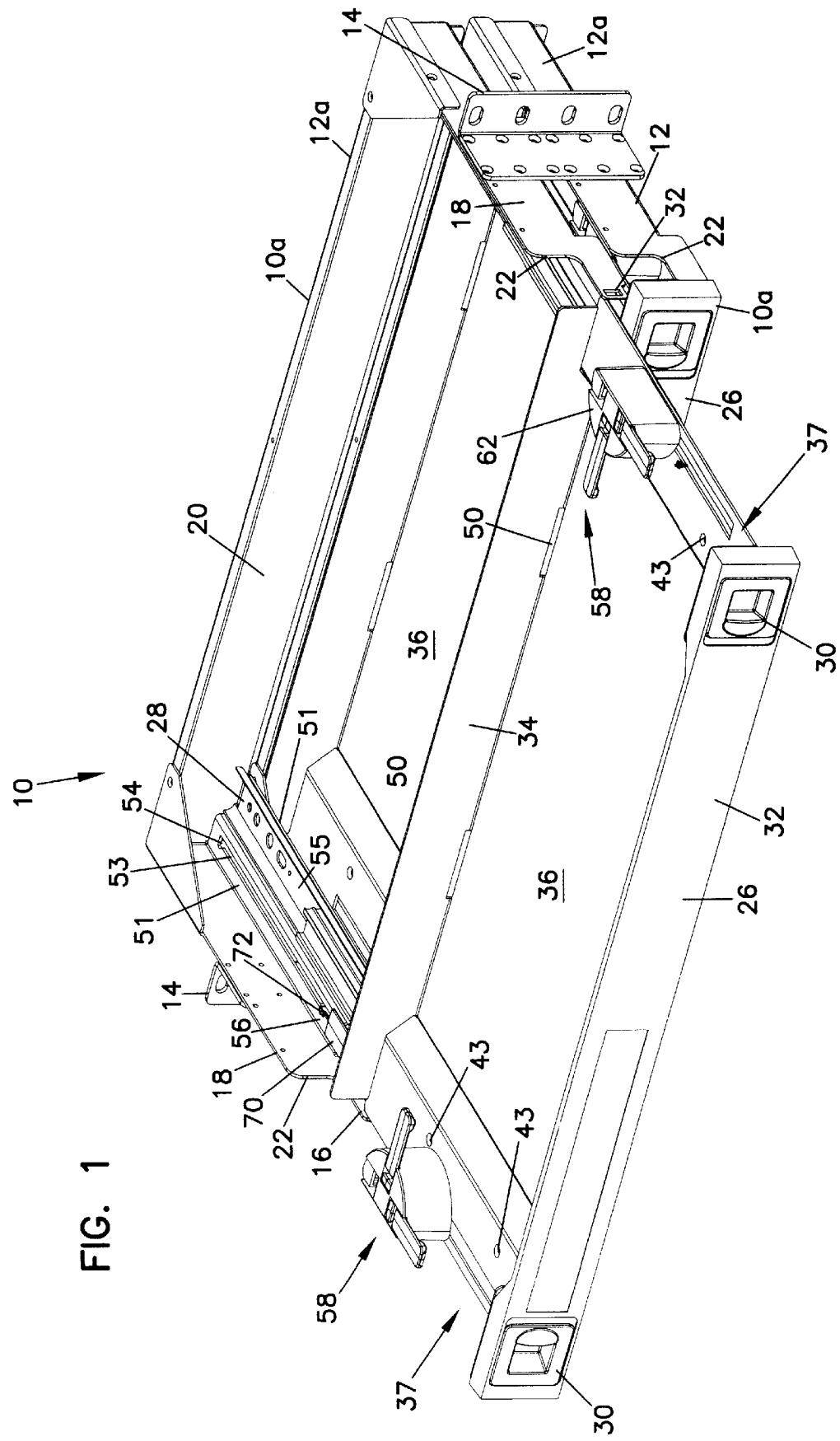
FIG. 1 is a perspective view of a cable management panel or module in accordance with the present invention, shown with one of the drawers in the open position, and shown without the tray insert.

Referring now to the several drawing figures in which identical elements are numbered identically, a cable management panel or module 10 according to the present invention is shown. Panel 10 includes a frame or chassis 12 with side brackets 14 for mounting to a rack, cabinet, enclosure, or other mounting fixture. Chassis 12 includes a front 16, opposed sides 18, and a rear 20. Sides 18 each include cable access openings 22 for cables entering or exiting chassis 12. Chassis 12 further includes one or more drawers 26 which slide horizontally during use to access the interior of a selected drawer.

Each drawer 26 includes cable management structure, as will be described more fully below. Examples of cable management structure include devices for storing the cables or connecting the cables to other cables and/or fiber optic devices, such as attenuators, couplers, switches, wave divisions multiplexers (WDMs), splitters/combiners, or splices. Drawers 26 are slidable relative to chassis 12 via two drawer slides 28 on opposite sides of chassis 12. Each drawer 26 includes two latches 30 for latching the drawer 26 in the closed position. Each latch 30 engages a side hole 32 in side 18 of chassis 12. Each drawer 26 further includes a front 32, a rear 34, and a base 36. Open sides 37 allow for cable entry and exit and prevent cable damage during sliding movement of drawers 26 when accessing the cables and the connectors or other devices in the drawer. Take-up mechanisms are provided, as described below, for managing the cables during sliding movement of drawers 26. The cable guides and radius limiters described below are provided so as to protect the cables and limit bends from going below the minimum bend radius of the cable. The cable retention tabs also described below help keep the cables in place once positioned under the tabs by the user.

Figure 6:
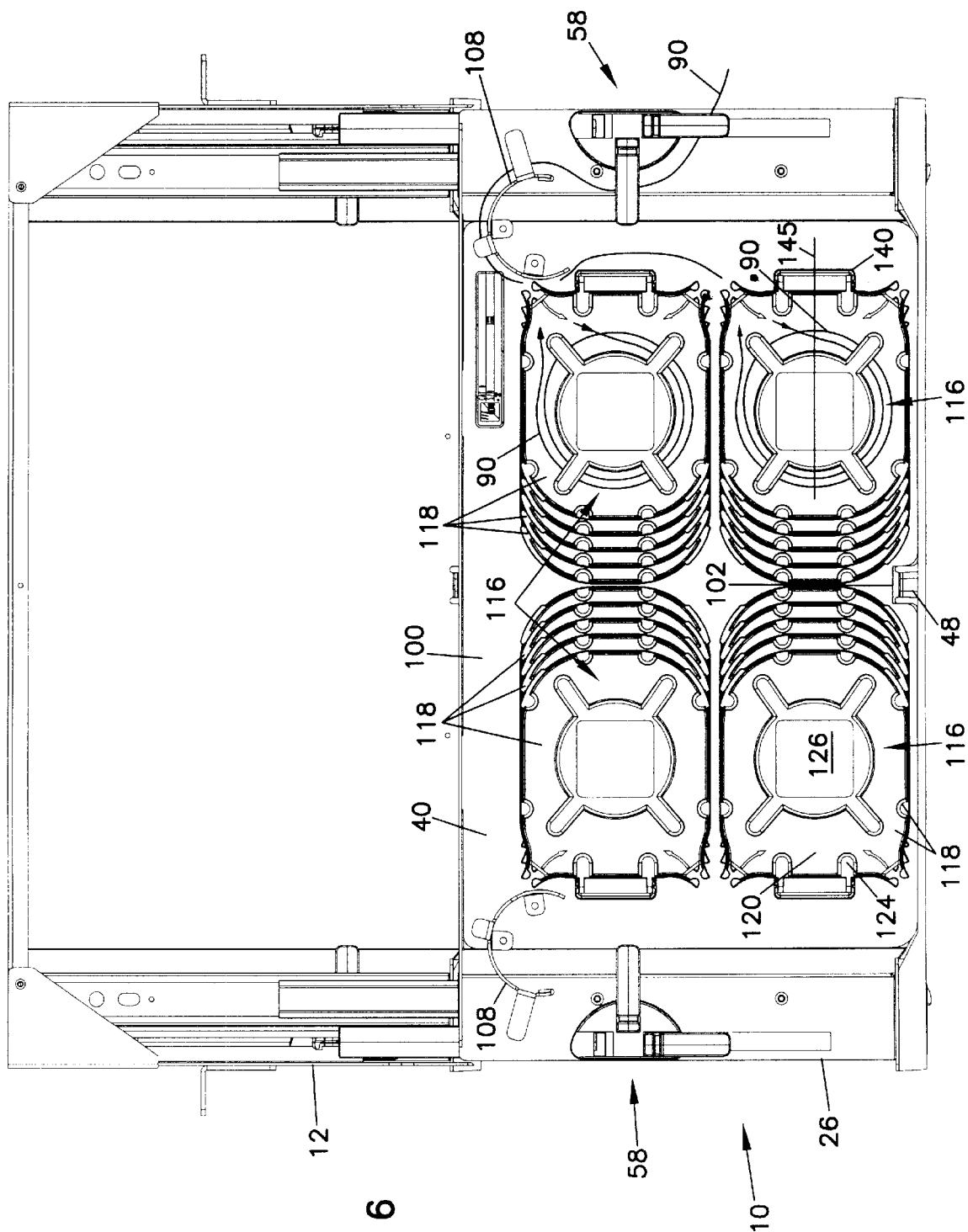
FIG. 6 is a top view of the cable management panel of FIG. 2 with a first tray insert positioned in the drawer.
Figure 7:
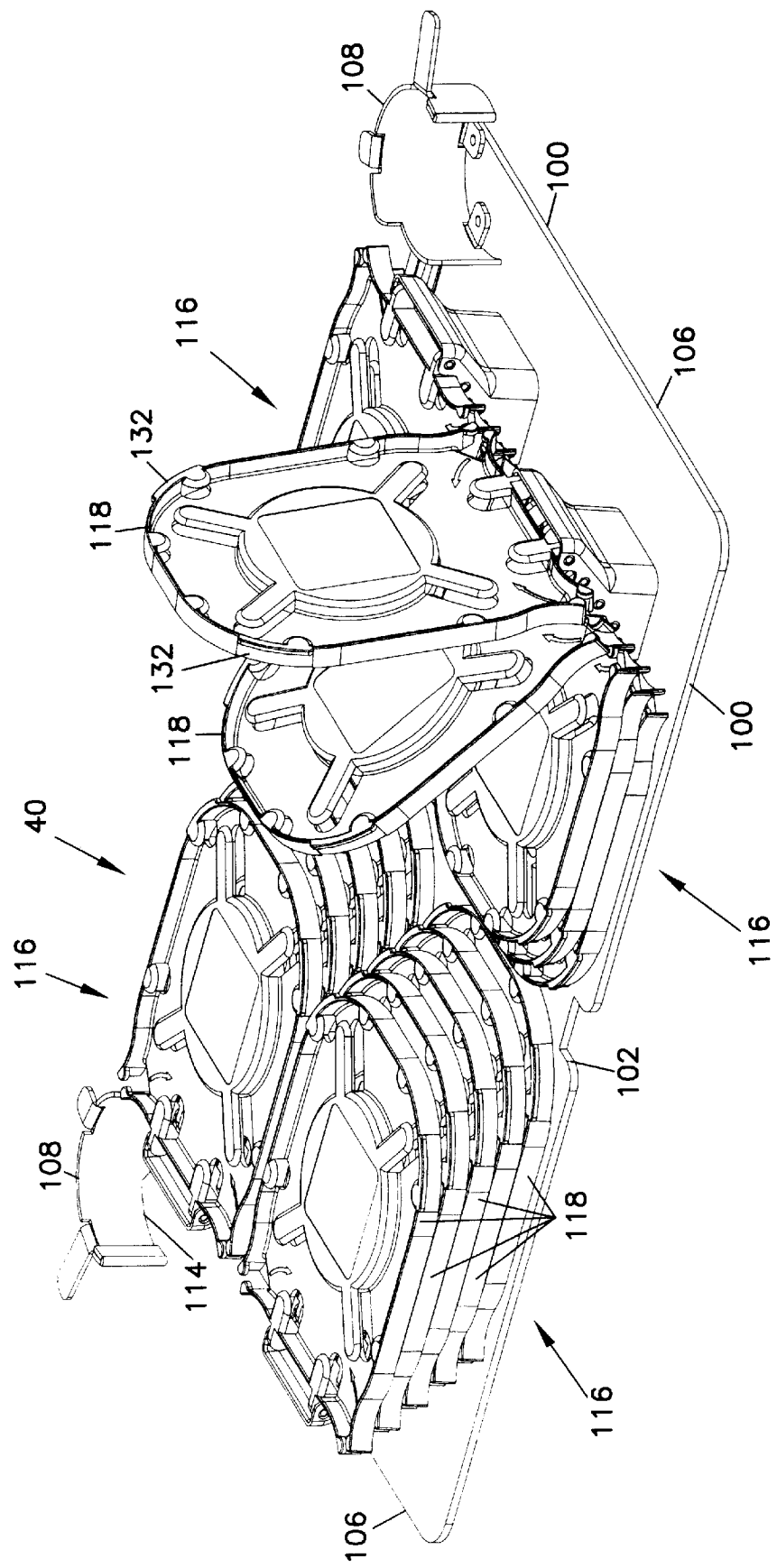
FIG. 7 is a perspective view of the tray insert of FIG. 6, with two of the storage trays in flipped positions.
Figure 8:
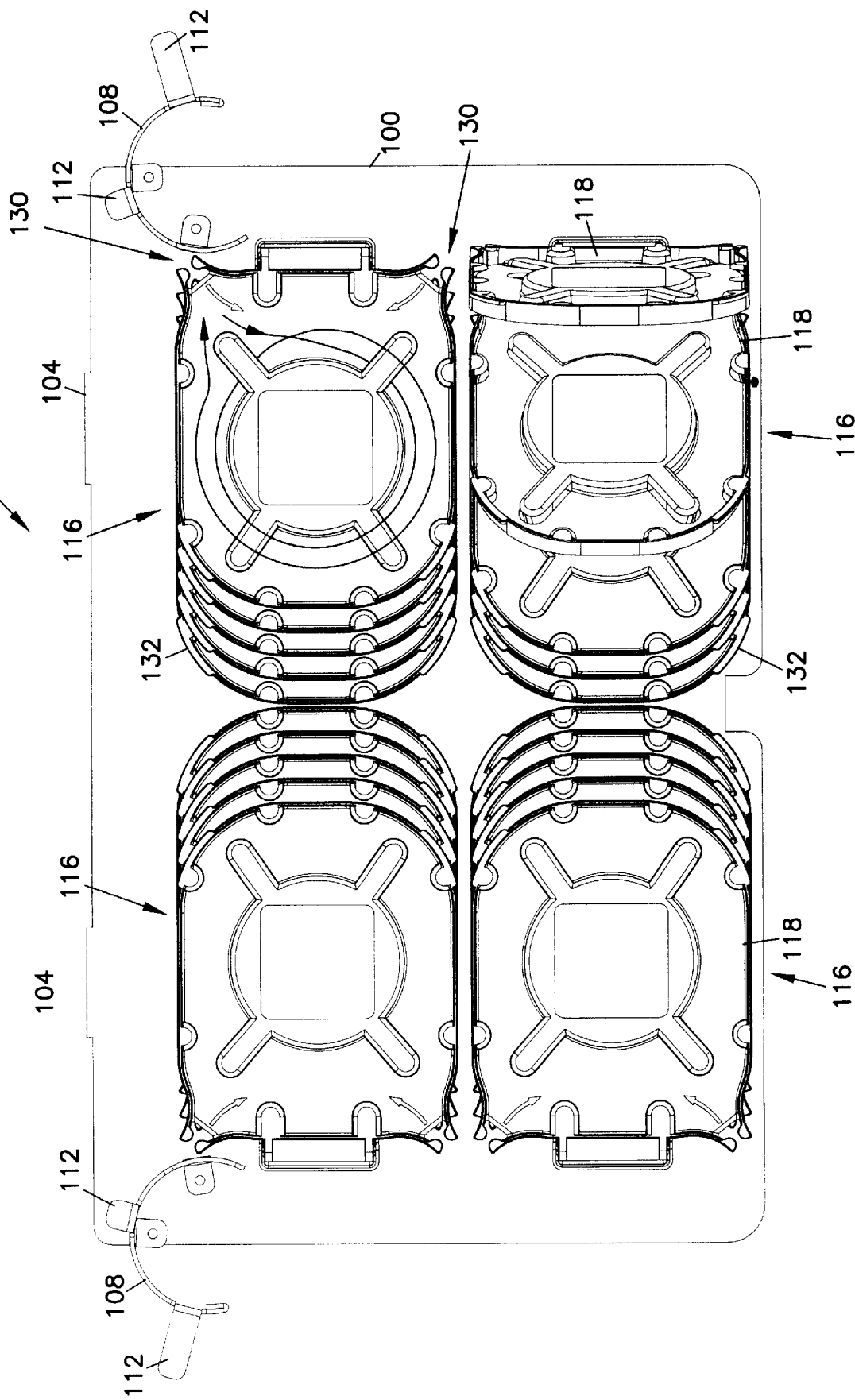
FIG. 8 is a top view of the tray insert of FIG. 7.

Each drawer interior is sized for receiving cable management and/or distribution structure. When the drawer is in the closed position, the cables and management or distribution structures in the interior are protected. In the preferred embodiments, the structure can be conveniently mounted on a tray insert which drops into the interior of drawer 26. This allows for convenient structuring of drawer 26 to serve one or more desired functions in module 10. FIG. 6 shows one preferred embodiment of a tray insert or drop-in plate 40 in accordance with the present invention. The tray inserts can be customized as the particular needs vary for panel 10. Alternatively, each drawer 26 can be assembled with the components mounted directly to the drawer bottom. Preferably, the individual drawers 26 are constructed as stackable and linkable sub-modules 10a, each with a sub-chassis 12a. Such modularity also allows for ease of use for a variety of different needs for the cable management system. Brackets 14 link the sub-chassis 12a together. FIG. 6 also shows one example cable pathway 90 into panel 10.

Referring again to FIGS. 1–5, base 36 of drawer 26 includes side plates 42, a central bottom 44, and an angled transition section 46 on each side of bottom 44 connecting to side plates. Base 36 further includes a key 48 adjacent to front 32. One or more slots 50 are positioned in rear 34. Key 48 and slots 50 are usable in mounting tray inserts 40 to drawer 26. Fasteners (screws) in holes 49 may also be used to secure tray inserts 40 to drawers 26.

Side plates 42 of base 36 of drawers 26 include longitudinal slots 52. Side plates 42 also mount to one end of each of slides 28 with fasteners through holes 43. Inwardly projecting side ledges 51 of chassis 12 each include longitudinal slots 53 and side notches 54, 56 which cooperate with a take-up mechanism 58 on each side of drawer 26 for managing optical fibers entering and exiting cable management panel 10. Side ledges 51 also mount to the opposite ends of drawer slides 28 with fasteners through holes 55. Side plates 42 are configured as raised surfaces or ledges which are positioned over drawer slides 28 and portions of take-up mechanism 58. Slots 52, 53 vertically overlap when drawer 26 is closed.

Take-up mechanism 58 includes a push member or radius limiter 62, preferably shaped as a half-moon or semi-circle, each with the curved portion 86 facing inwardly, and the planar portion 88 facing outwards. Radius limiter 62 includes a plurality of tabs 64 for cable retention. In one preferred embodiment, tabs 64 include snaps 66 which are received in slots 68 of radius limiter 62. Extending rearwardly and beneath radius limiter 62 is an extension 70 which includes a flexible rear tab 72, and a lower tab 73, both for receipt in slot 53. Tab 73 includes lips 75 to snap mount to slot 53. Extension 70 also snaps to an underside of radius limiter 62 with snaps 74 which are slideably positioned in slots 52. Radius limiter 62 is therefore moveably mounted relative to chassis 12 and drawer 26. Radius limiter 62 acts as a guide for cables passing through access opening 22 on each side of drawer 26.

Retention structure is provided with take-up mechanism 58 to limit movement of radius limiter 62 to selected times for better control and positioning of the cables. As will be described below, projection 72a of tab 72 resides in notch 56 to allow drawer 26 to slide rearwardly relative to radius limiter 62, during closing. Slot 52 eventually bottoms out and moves projection 72a out of notch 56, thereby causing radius limiter 62 to move rearwardly with drawer 26. Notch 54 also retains radius limiter 62 relative to chassis 12 during initial opening of drawer 26. Each notch 54, 56 includes a ramped surface 54a, 56a allowing release of radius limiter 62 as drawer 26 pulls or pushes on projection 72a during use.

Referring now to FIGS. 6–14, tray insert 40 includes a base 100 including a front notch 102, and rear projections 104. Front notch 102 receives key 48, and projections 104 are received by slots 50 in drawer 26. Side edges 106 are positioned adjacent transition sections 46 of base 36 of drawer 26. Base 100 also includes two upwardly extending rear radius limiters 108. Each radius limiter 108 includes a main arcuate section 110, a plurality of outwardly extending retention tabs 112, and a lower notch 114 which is positioned over transition section 46 and side plate 42 of base 36 of drawer 26. Cables entering drawer 26 extend from side access opening 22, to take-up mechanism 58 to rear radius limiter 108. FIG. 6 shows take-up mechanism 58 cooperating with radius limiter 108 for guiding cable 90 into drawer 26.

Figure 9:
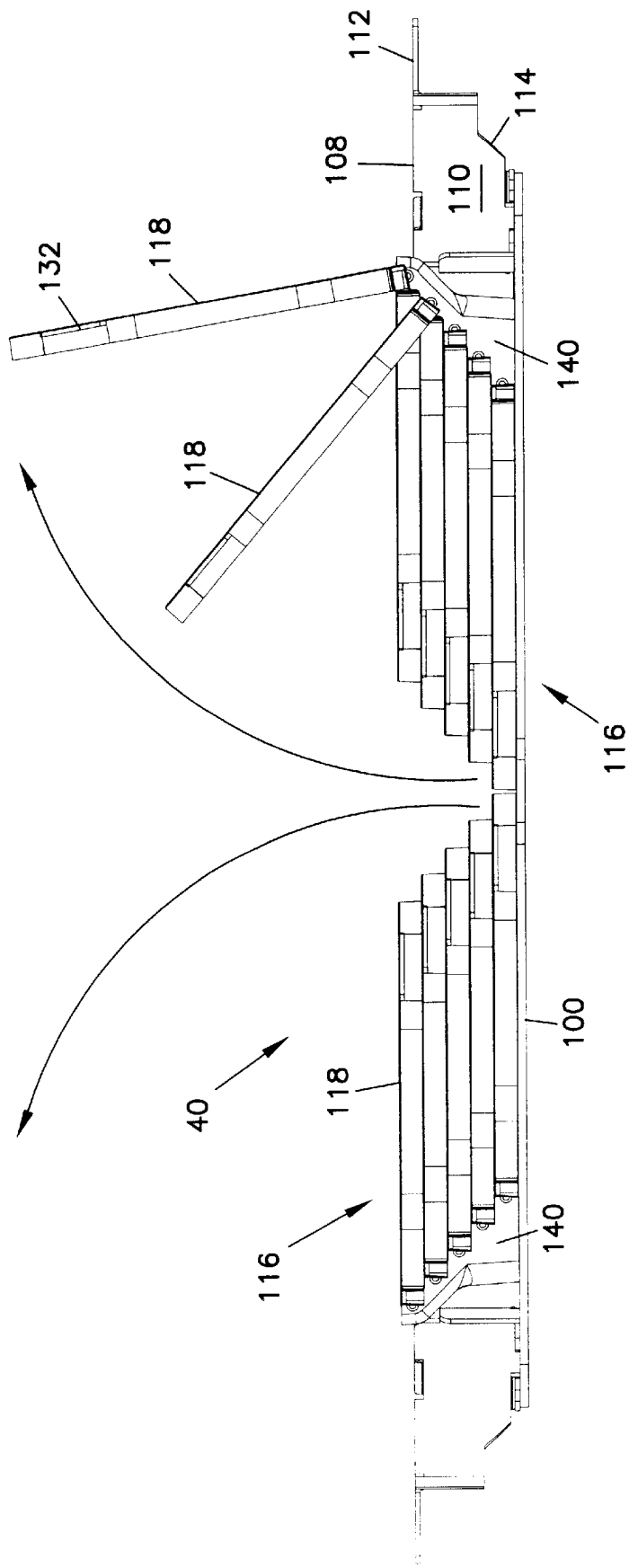
FIG. 9 is a front view of the tray insert of FIG. 7.
Figure 10:
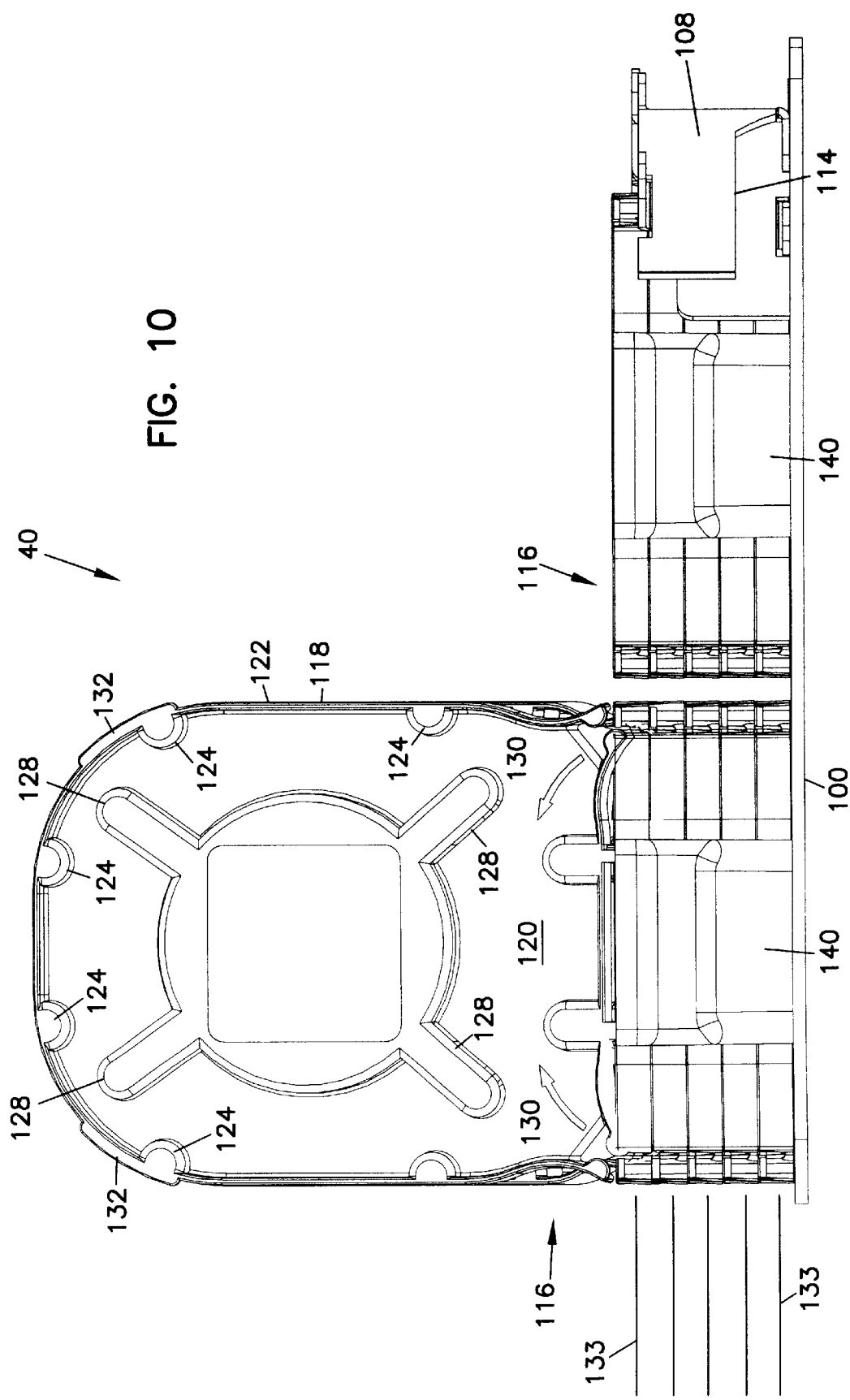
FIG. 10 is a side view of the tray insert of FIG. 7.
Figure 11:
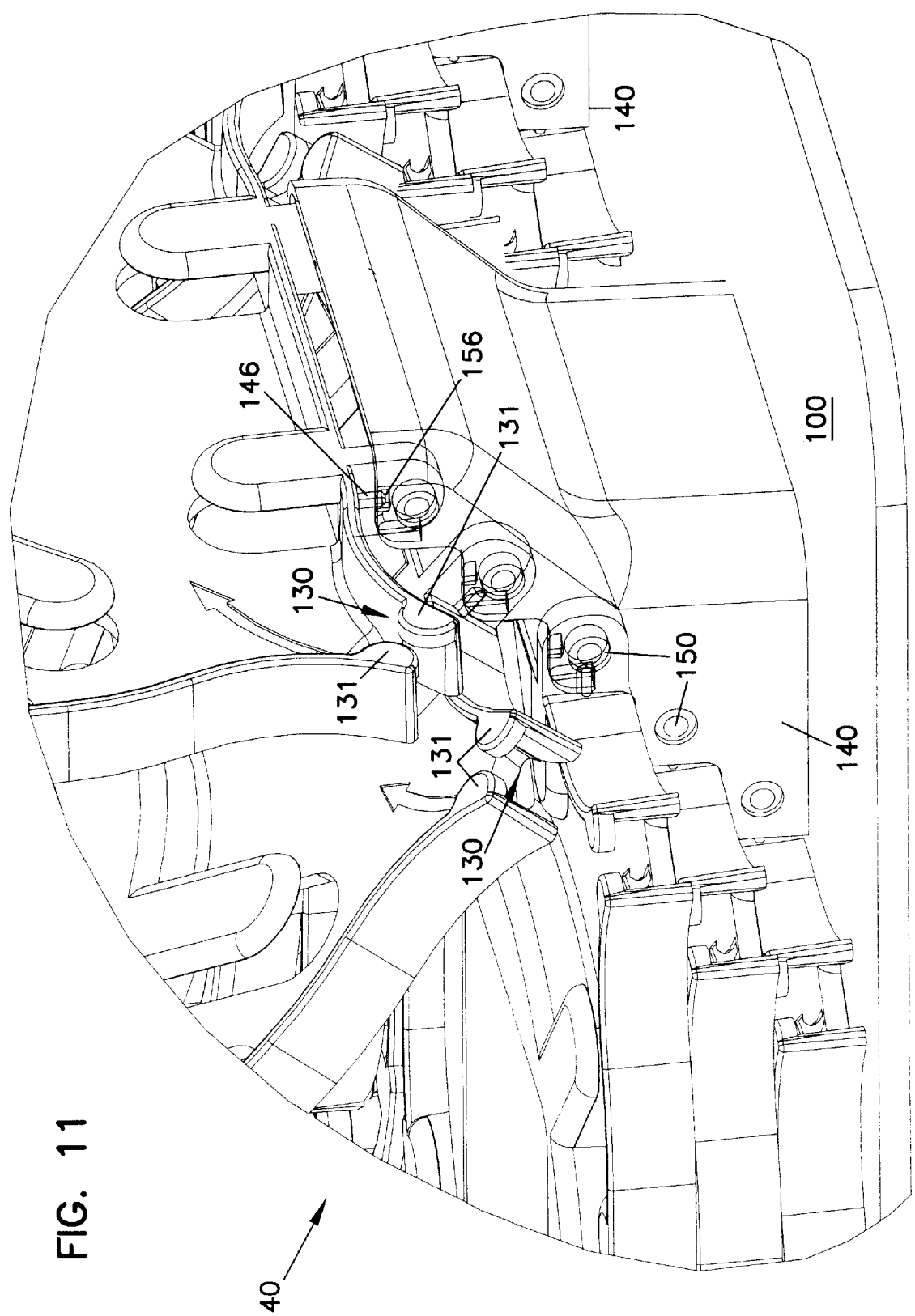
FIG. 11 is an enlarged perspective view of one of the stacks of storage trays.
Figure 12:
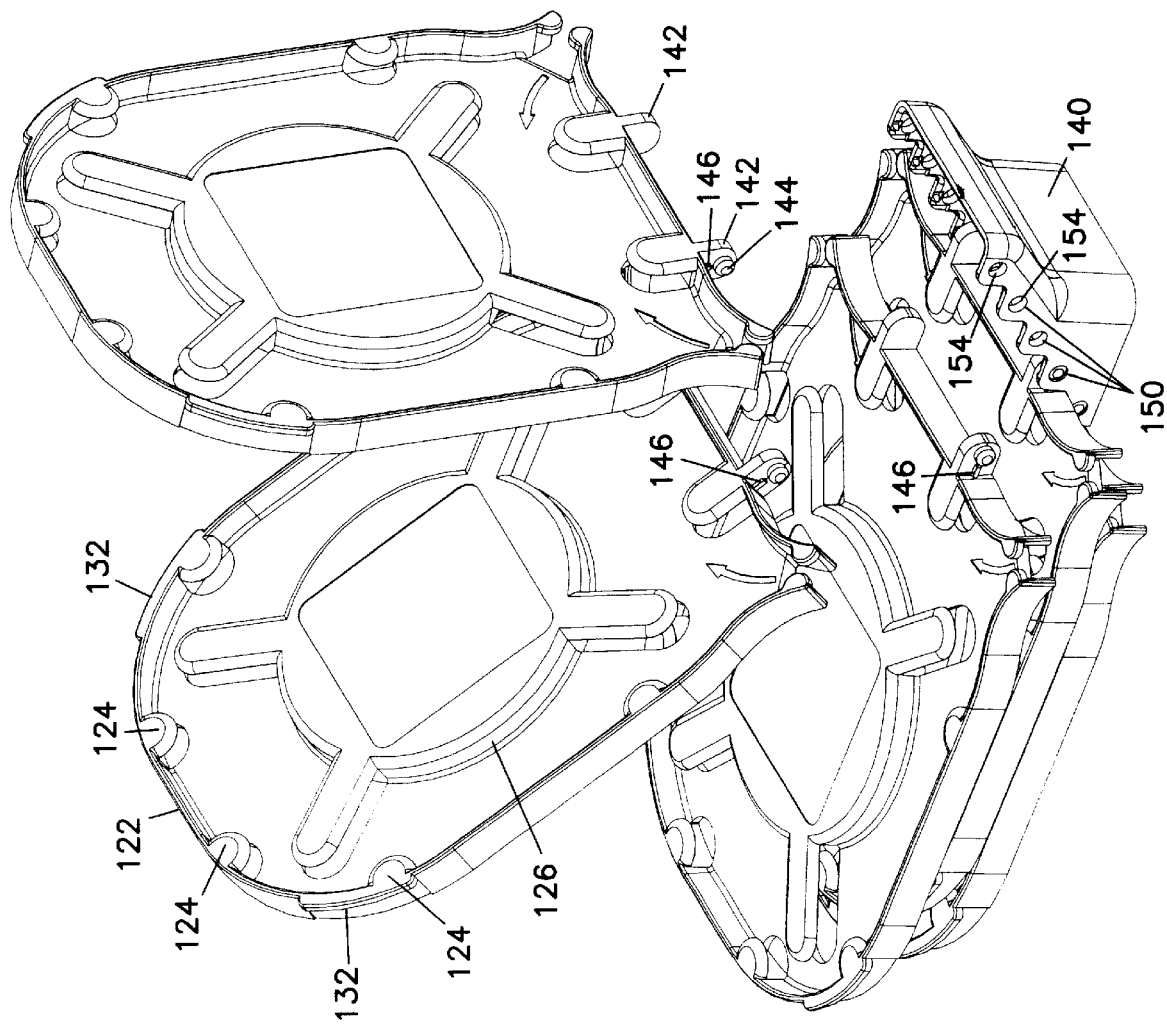
FIG. 12 is an exploded view of one of the stacks of storage trays with some of the trays removed for viewing.
Figure 13:
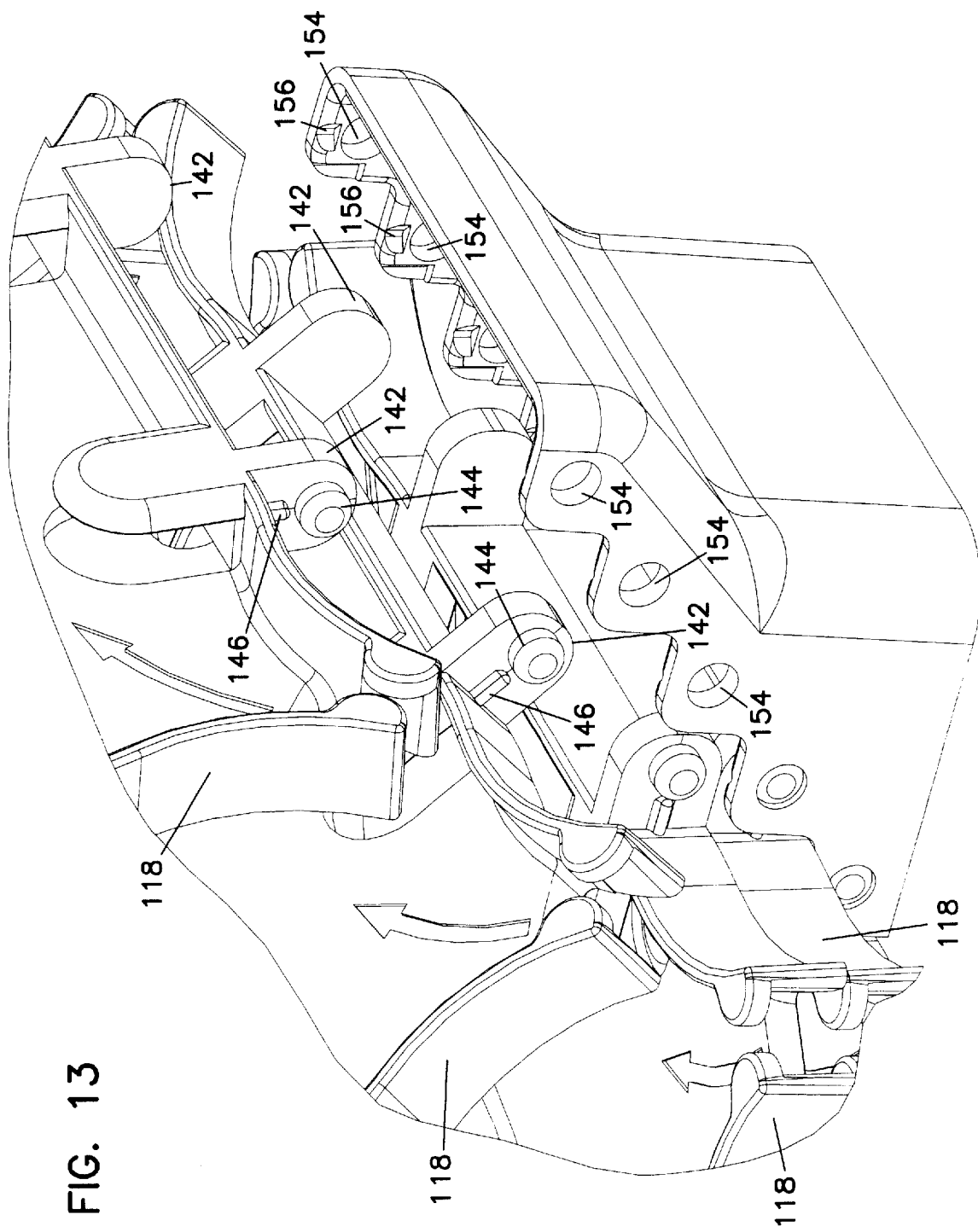
FIG. 13 is an enlarged exploded view of the storage trays of FIG. 12.

Base 100 of example tray insert 40 further includes one or more stacks 116 of rotatably mounted or flippable storage trays 118. Four stacks 116 are shown for insert 40. The trays 118 on the right and left sides flip in opposite directions as shown in FIG. 9. By flipping the trays 118, access to the underneath trays in each stack is provided.

Each tray 118 includes a planar base 120, surrounded by an outer peripheral edge 122. Inwardly extending tabs 124 are provided for cable management. A center spool 126 extends upwardly from base 118, and includes a plurality of cable retention tabs 128. Tray 118 further includes two entry/exit points 130. Cable retention tabs 131 are positioned at each entry/exit point 130. Finger tabs 132 can be grasped by a user's finger to rotate each tray 118 about its rotation axis 133. Each tray 118 in stack 116 is rotatably mounted to base 100 with a stepped tray mount 140. Tray 118 includes two projections 142, each having an outwardly projecting pivot post or pin 144 and an outwardly projecting retention tab or bump 146. Tray mount 140 includes opposed and staggered mounting plates or locations 150 each having holes 154 for receiving pins 144 of trays 118. The staggering, or stair-step, allows for identical trays to be flipped from a horizontal position upwardly so as to allow user access to each tray.

A detent arrangement is provided for holding the trays in the flipped positions. Mounting plates 150 each include a notch or groove 156 sized for receiving tab 146 of each projection 142 to maintain each tray in an upward pivoted position when placed there by the user. The trays 118 stay pivoted upwardly to allow easy and hands-free access to the tray underneath the flipped trays. Notches 156 and tabs 146 act parallel to the rotation axis of each tray 118. Preferably, trays 118 and tray mount 140 are made from plastic. Pins 144 preferably snap into holes 154 to mount trays 118 to tray mount 140. Cable enters tray 118 at one of points 130, and is wound around spool 126 an appropriate number of times. The cable then exits tray 118 at one of the points 130. In the example shown, one cable 90 is stored per tray 118 (See FIGS. 6 and 8).

Figure 14A:
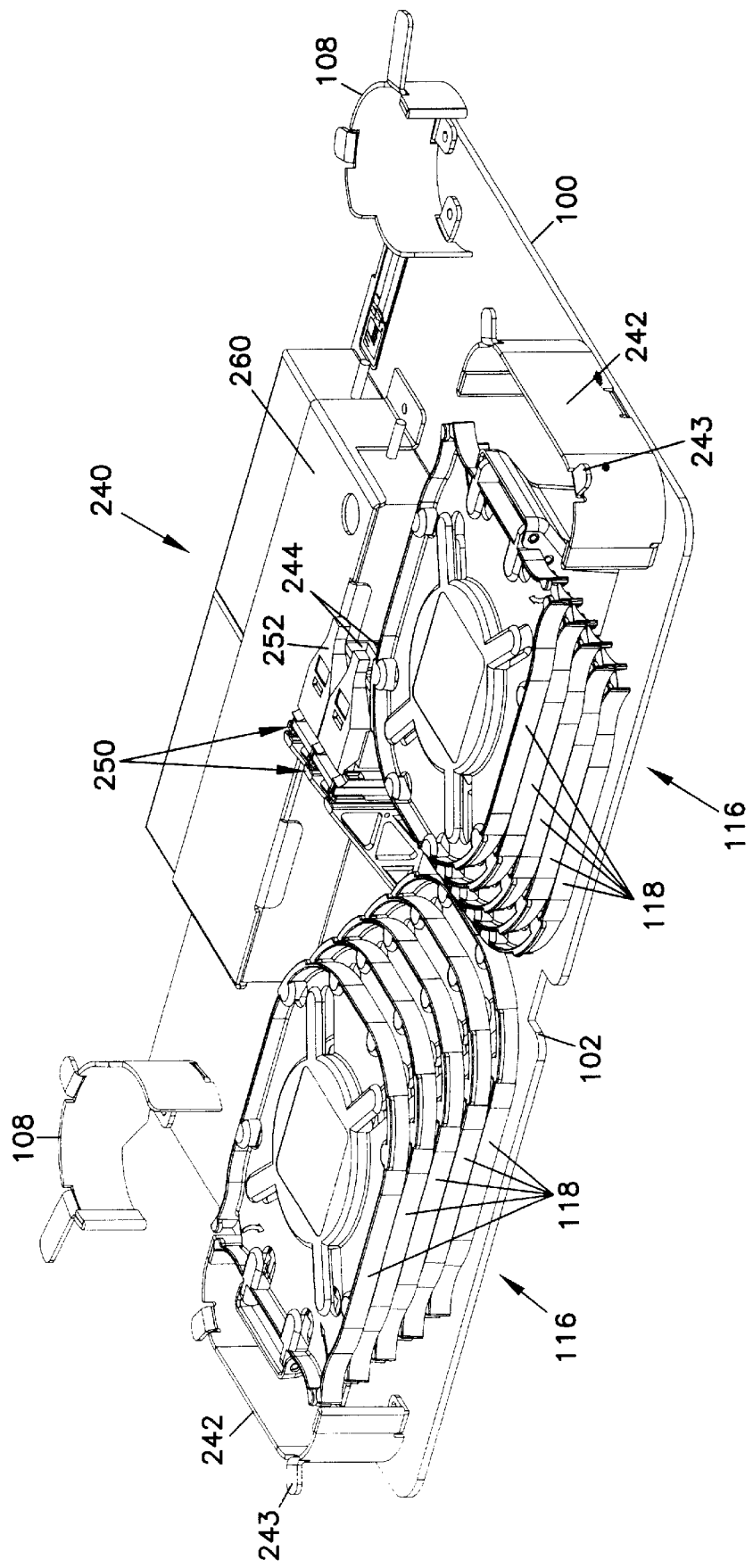
FIGS. 14A and B show a second embodiment of a tray insert usable in the cable management panel of FIG. 1.

Referring now to FIGS. 14A and B, a second preferred embodiment of a tray insert 240 is shown including some common parts as insert 40, and some different parts. Insert 240 includes a similar planar base 100 with front notch 102 and rear projections 104. Base 100 of tray insert 240 also includes rear radius limiters 108. Base 100 is similar in profile, but may have different structure, for example, holes, for mounting the various cable management devices to tray insert 240. Tray insert 240 also includes two front stacks 116 of trays 118. Insert 240 differs in that it also includes side radius limiters 242 and retention tabs 243 positioned on opposite sides of base 100 adjacent to stacks 116 of trays 118. Base 100 further includes adapters 244 for connection to fiber optic connectors. Adapters 244 are preferably movably mounted to base 100 in sliding adapter arrangement 250. Lever arm 252 allows a slide assembly 254 to be lifted upwardly to provide easier access to adapters 244. Each pair of adapters 244 is separately movable with each respective lever 252. Further details of an example of a sliding adapter arrangement like that shown is described in U.S. Pat. No. 5,497,444, the disclosure of which is hereby incorporated by reference. Other adapter arrangements are possible, including arrangements which do not include movable adapters. Tray insert 240 also includes a wave division multiplexer arrangement with wave division multiplexers (WDMs) 260 connectable to the cables in drawer 26. Cables enter tray insert 240 for connection to adapters 244, and further connection to WDMs 260. Excess cable lengths can be stored in trays 118 and/or wound past limiters 242.

Figure 15A:
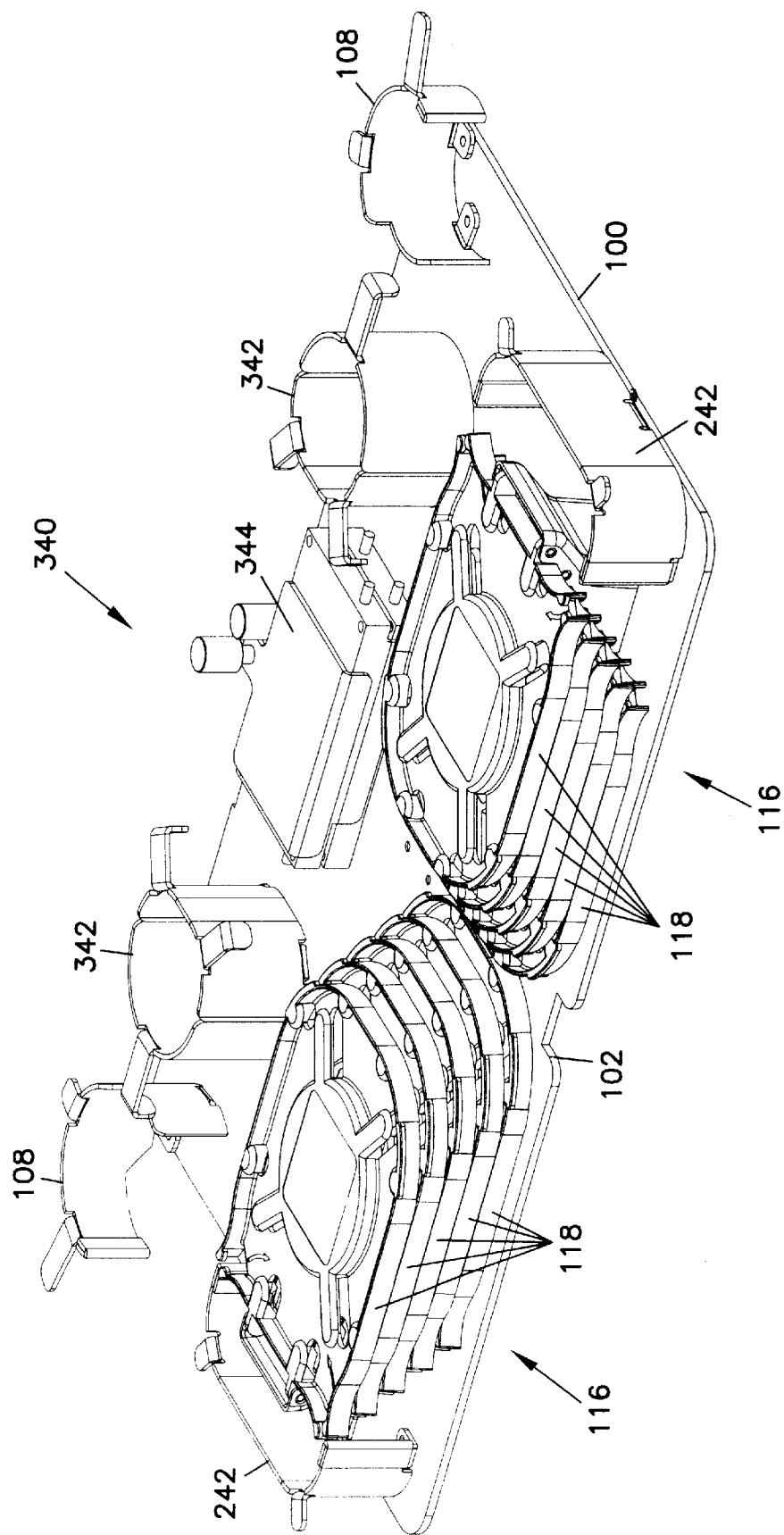
FIGS. 15A and B show a third embodiment of a tray insert usable in the cable management panel of FIG. 1.
Figure 15B:
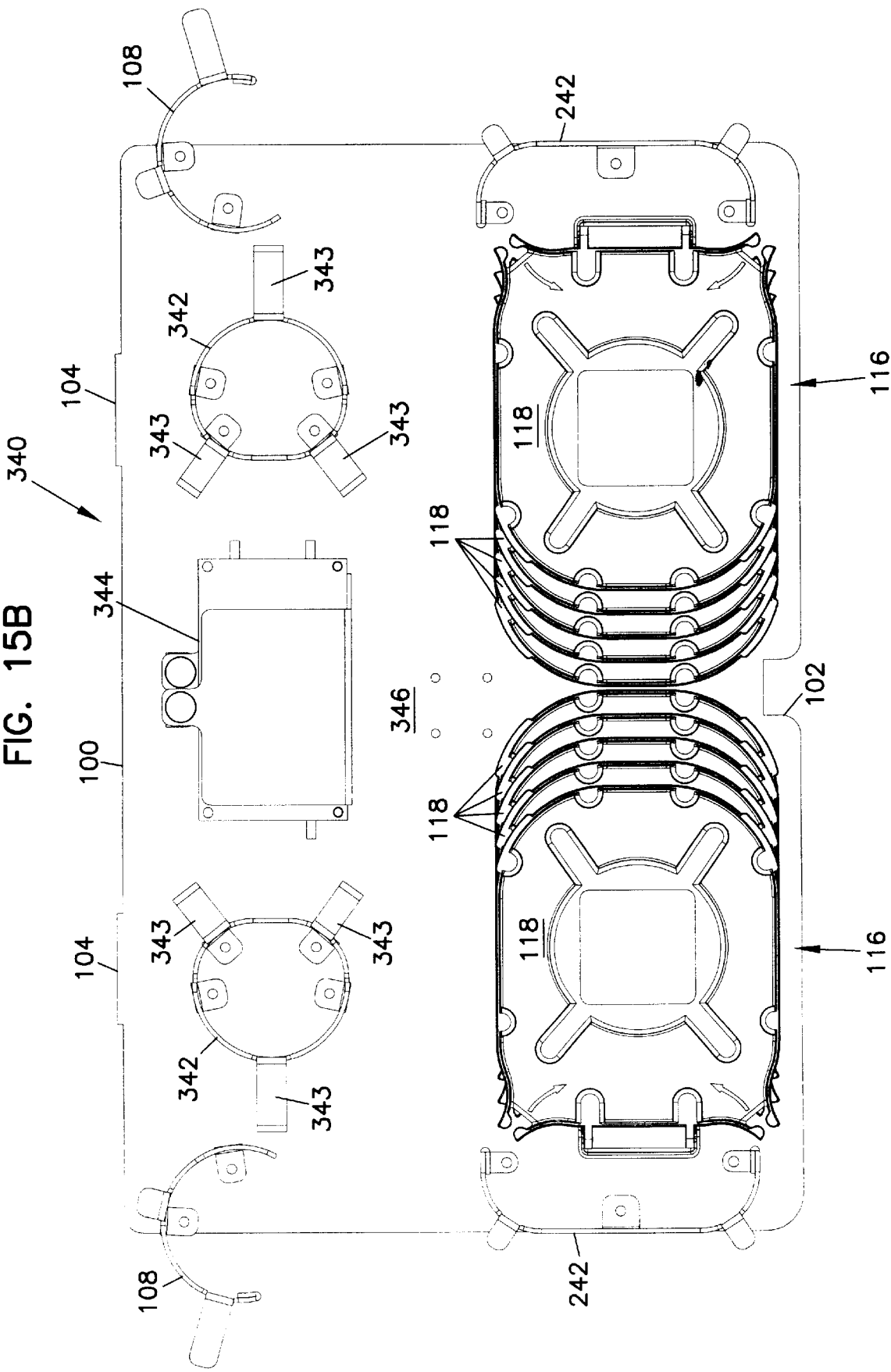

Referring now to FIGS. 15A and B, a third preferred embodiment of a tray insert 340 is shown including rear radius limiting spools 342 with tabs 343 and an optical service channel device (OSC) 344. Sliding adapter assemblies like assemblies 250 can be provided on base 100 at region 346. Cables enter tray insert 340 for connection to OSC 344, and adapters (if provided). Excess cable is stored in trays 118. Cable passes by spools 342 or limiters 242 to take up the excess and to prevent excessive bending or stress on the fibers.

Figure 16B:
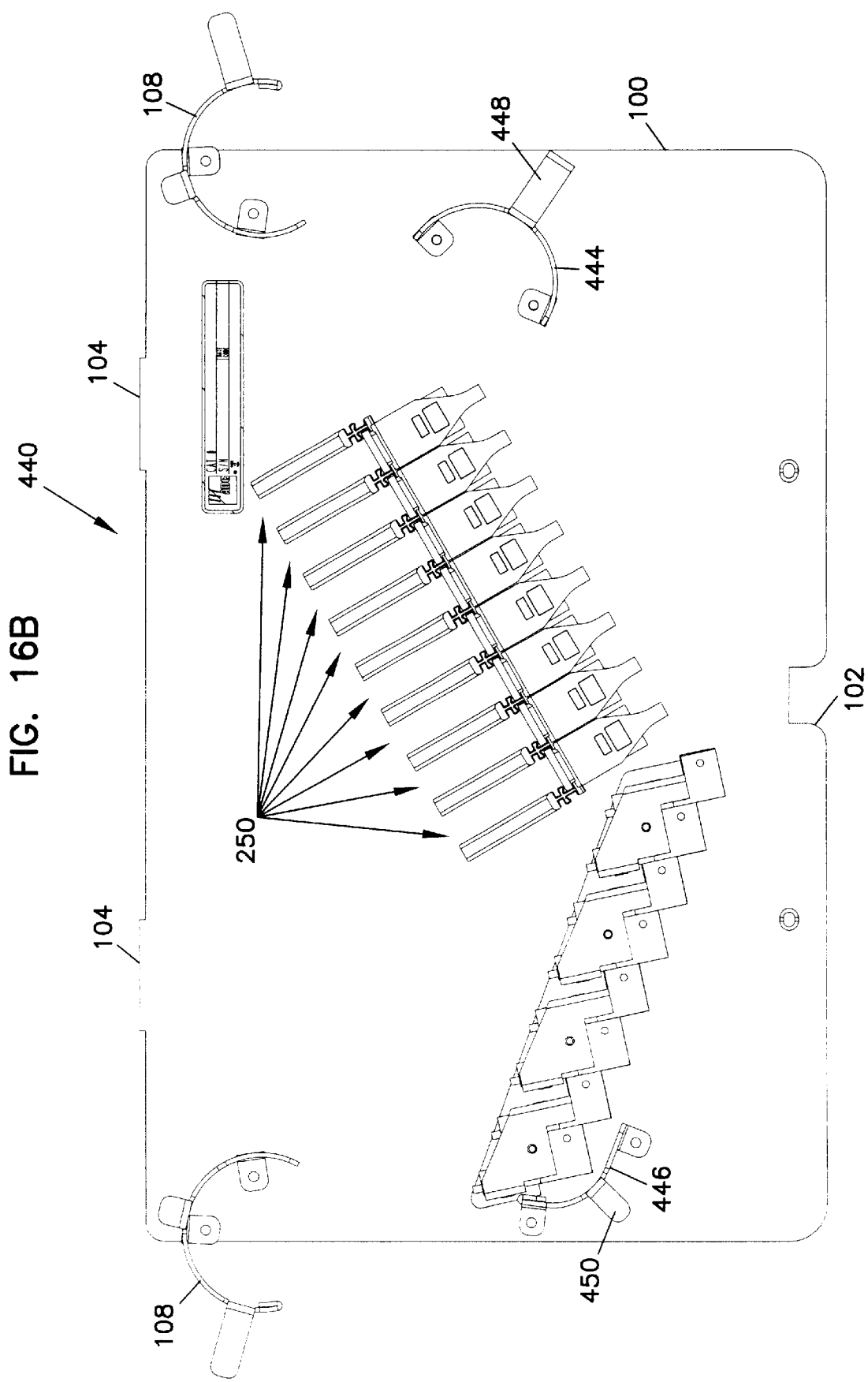
FIGS. 16A and B show a fourth embodiment of a tray insert usable in the cable management panel of FIG. 1.

Referring now to FIGS. 16A and B, a fourth preferred embodiment of a tray insert 440 is shown. A plurality of sliding adapter arrangements 250 are shown on one portion of base 100. Attenuators 442 are shown on a second portion of base 100. Fibers enter and exit tray insert 440 and are connected through adapters 244 and attenuators 442. Radius limiters 444, 446 with tabs 448, 450 are provided for assisting management of the cables.

Figure 17A:
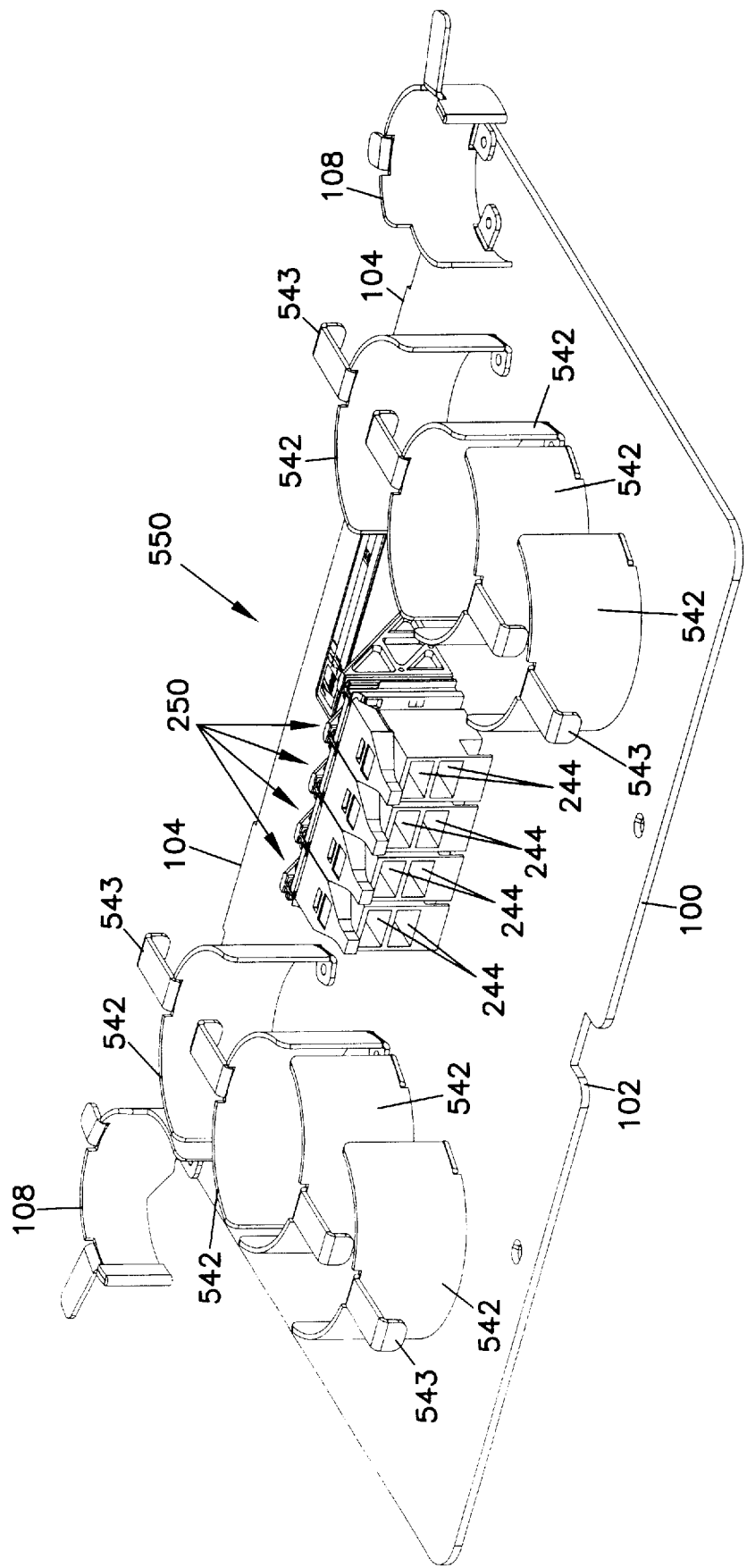
FIGS. 17A and B show a fifth embodiment of a tray insert usable in the cable management panel of FIG. 1.
Figure 18C:
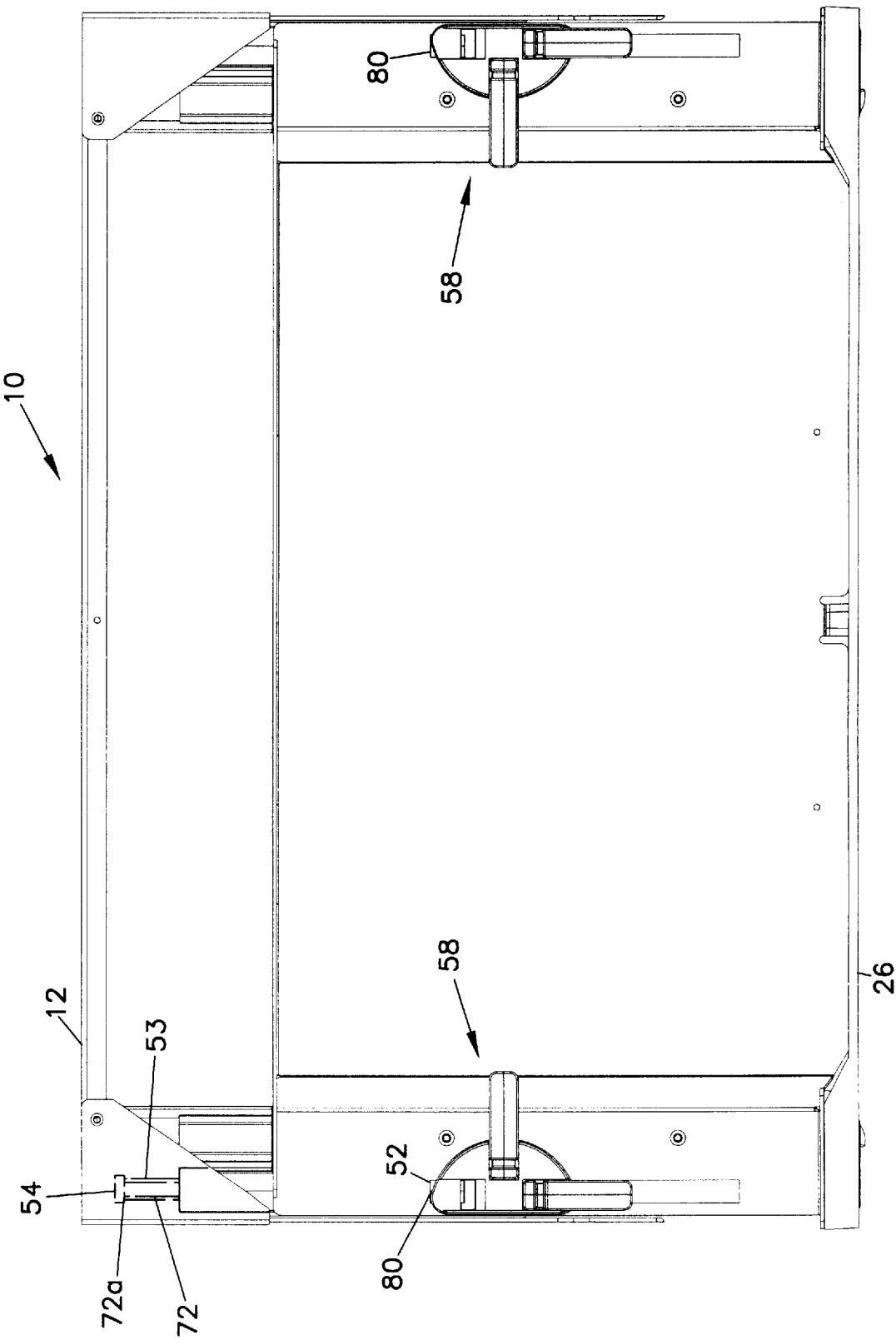
Figure 18D:
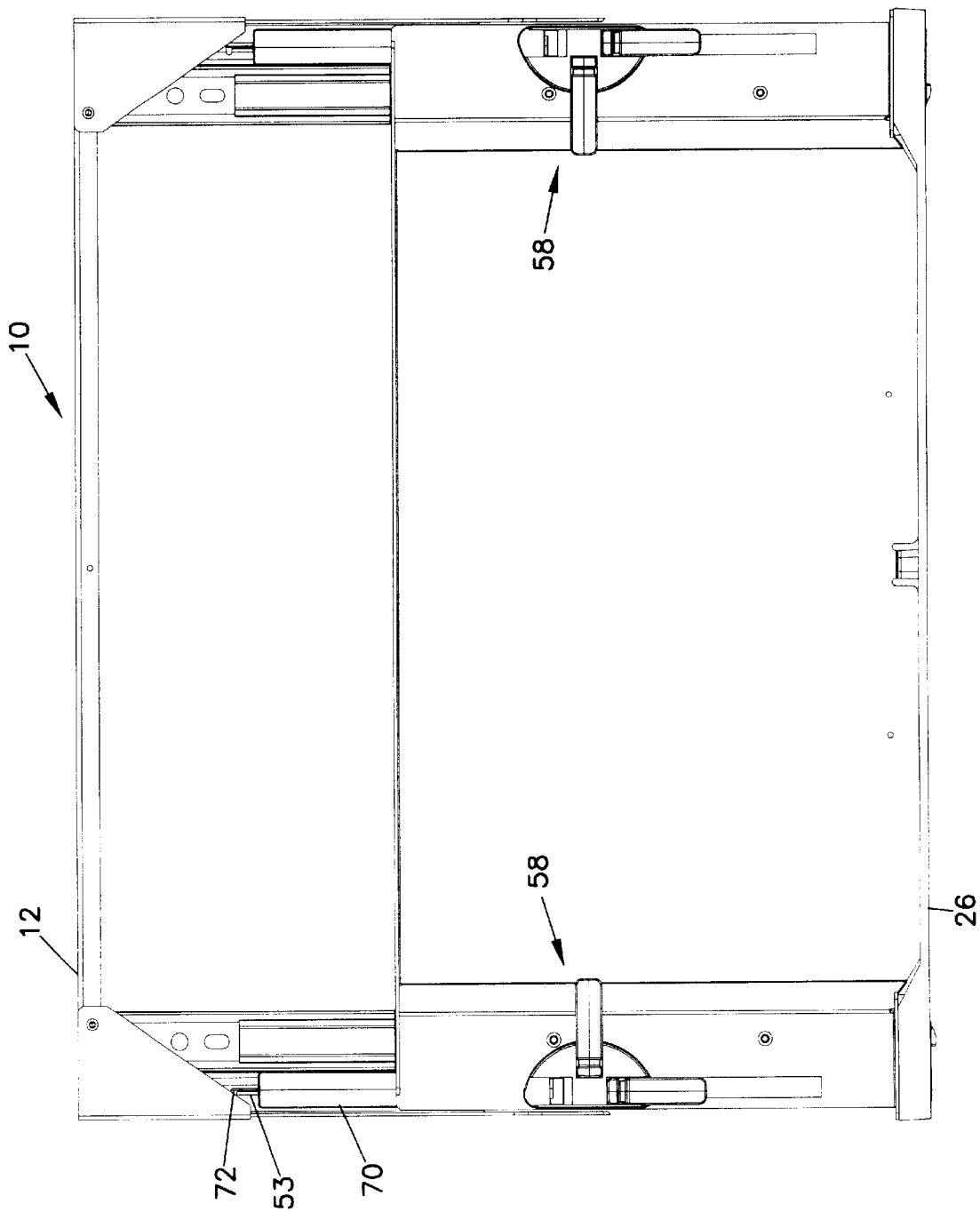

Referring now to FIGS. 17A and B, a fifth preferred embodiment of a tray insert 550 is shown. Sliding adapter arrangements 250 are positioned in a central portion of base 100, and a plurality of radius limiters 542 with tabs 543 are positioned to provide variable and selectable pathways for storage of the cables on insert 550. Adapters 244 can each be provided with a built-in attenuator.

Figure 2:
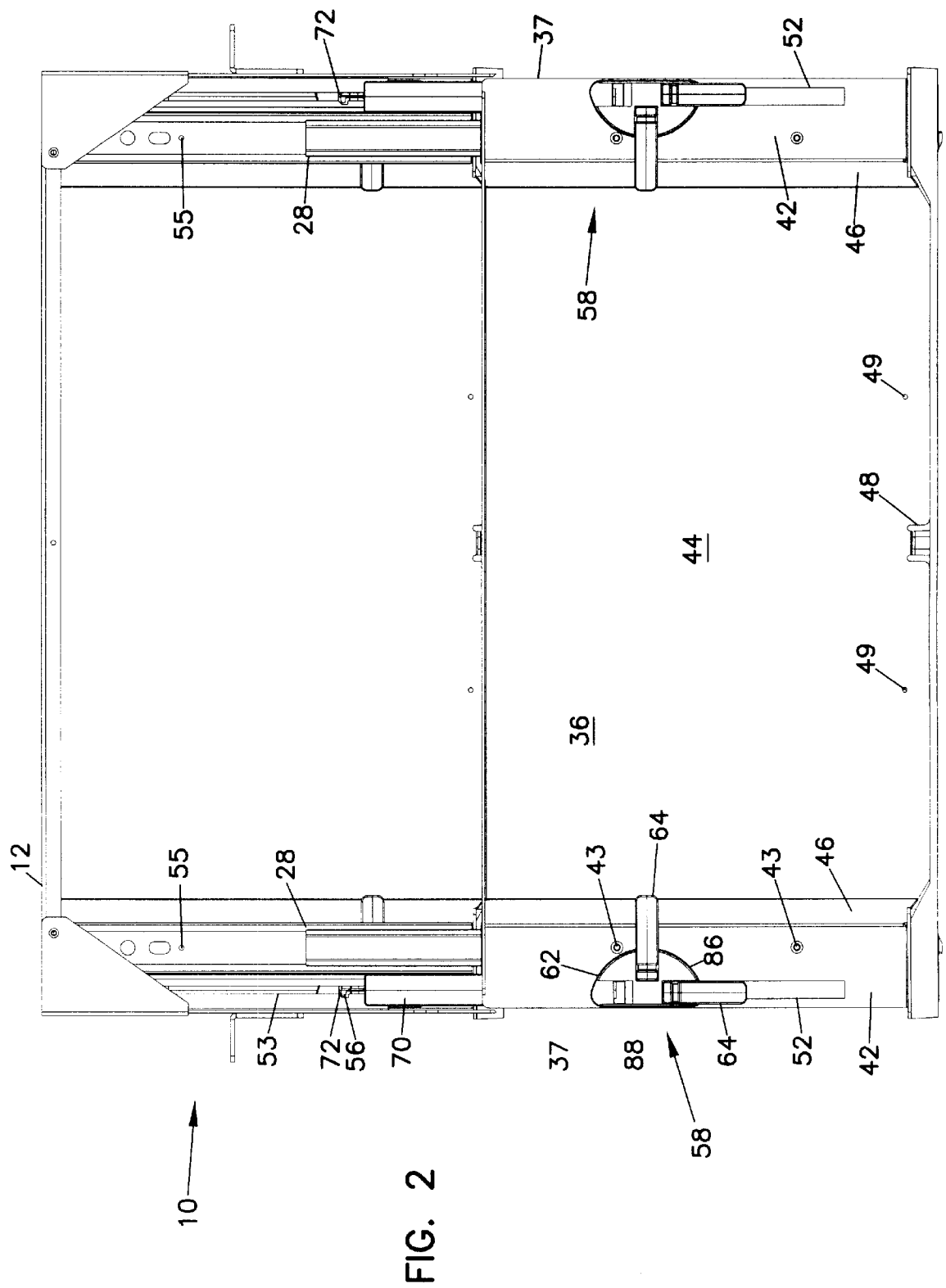
FIG. 2 is a top view of the cable management panel of FIG. 1.
Figure 3:
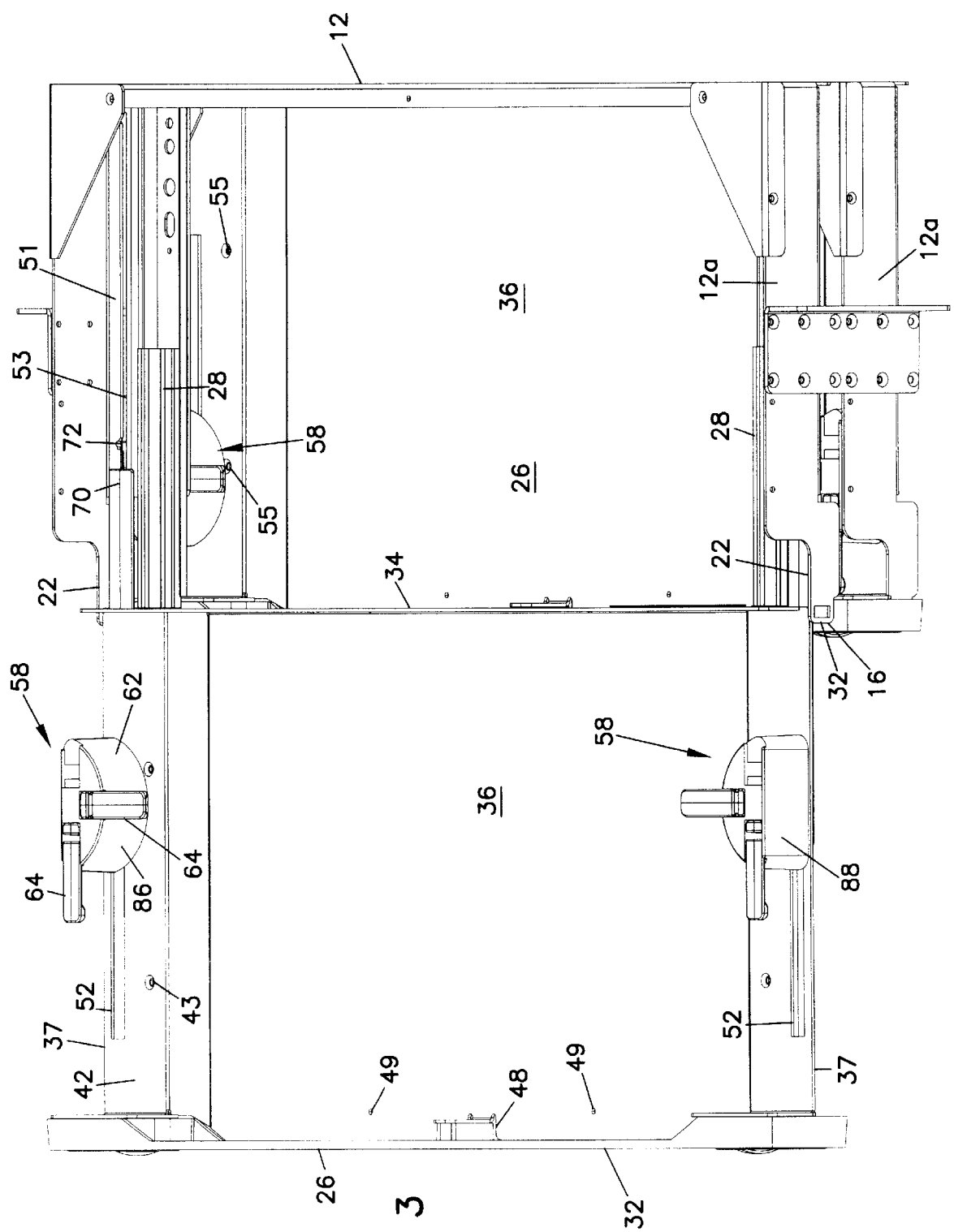
FIG. 3 is a side perspective view of the cable management panel of FIG. 1.
Figure 3B:
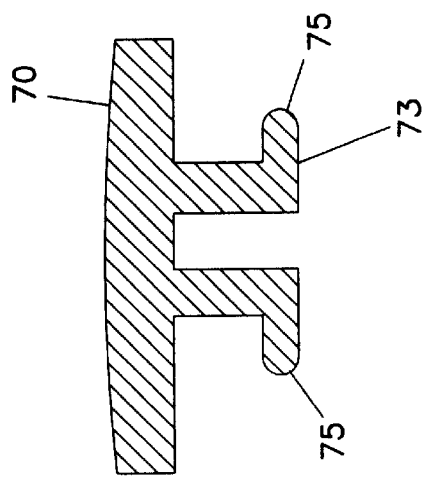
FIG. 3B is a further cross-sectional view of a portion of the take-up mechanism along lines 3B—3B of FIG. 3A.
Figure 3A:
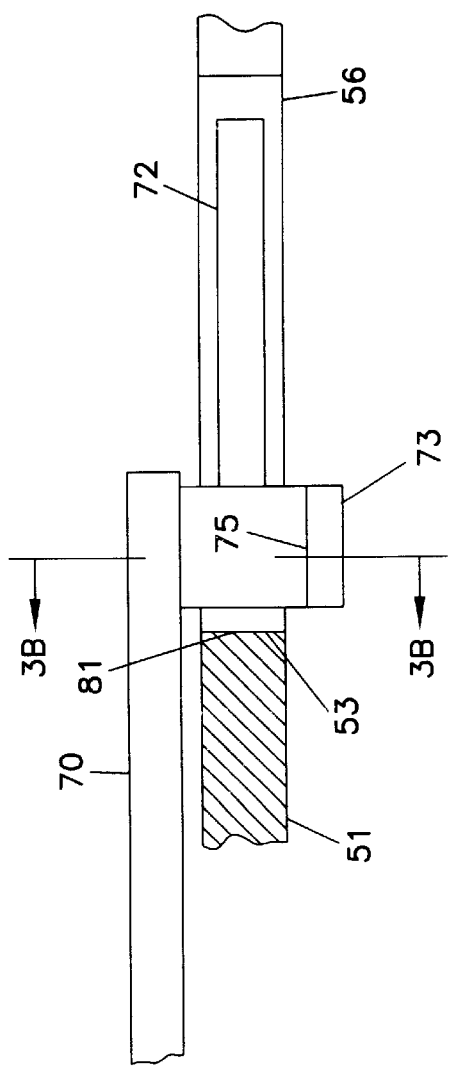
FIG. 3A is a cross-sectional side view through a portion of the chassis showing the retention system of the take-up mechanism.

FIGS. 18A–E and 19A–D illustrate in combination with FIG. 2 the positioning of take-up mechanism 58 during use to prevent undue stress, pulling or pushing on the cables (optical fibers) entering and exiting module 10 through side access openings 22. Radius limiter 62 and tab 72 are held in place relative to chassis 12 by rear notch 54 until drawer 26 has moved forward a sufficient amount, such as when a rear end 80 of slot 52 engages the connection between radius limiter 62 and extension 70 (compare FIGS. 18C and 18D). At that point, radius limiter 62 moves with drawer 26 toward the open position.

In the present example, drawer 26 and radius limiter 62 stop moving with respect to chassis 12 when lower tab 73 reaches a front end 81 of slot 53 and tab 72 is positioned in front notch 56. Alternatively, drawer slides 28 can limit the sliding extension of drawer 26. As shown in FIG. 2, drawer 26 is now in the completely open position.

Figure 4:
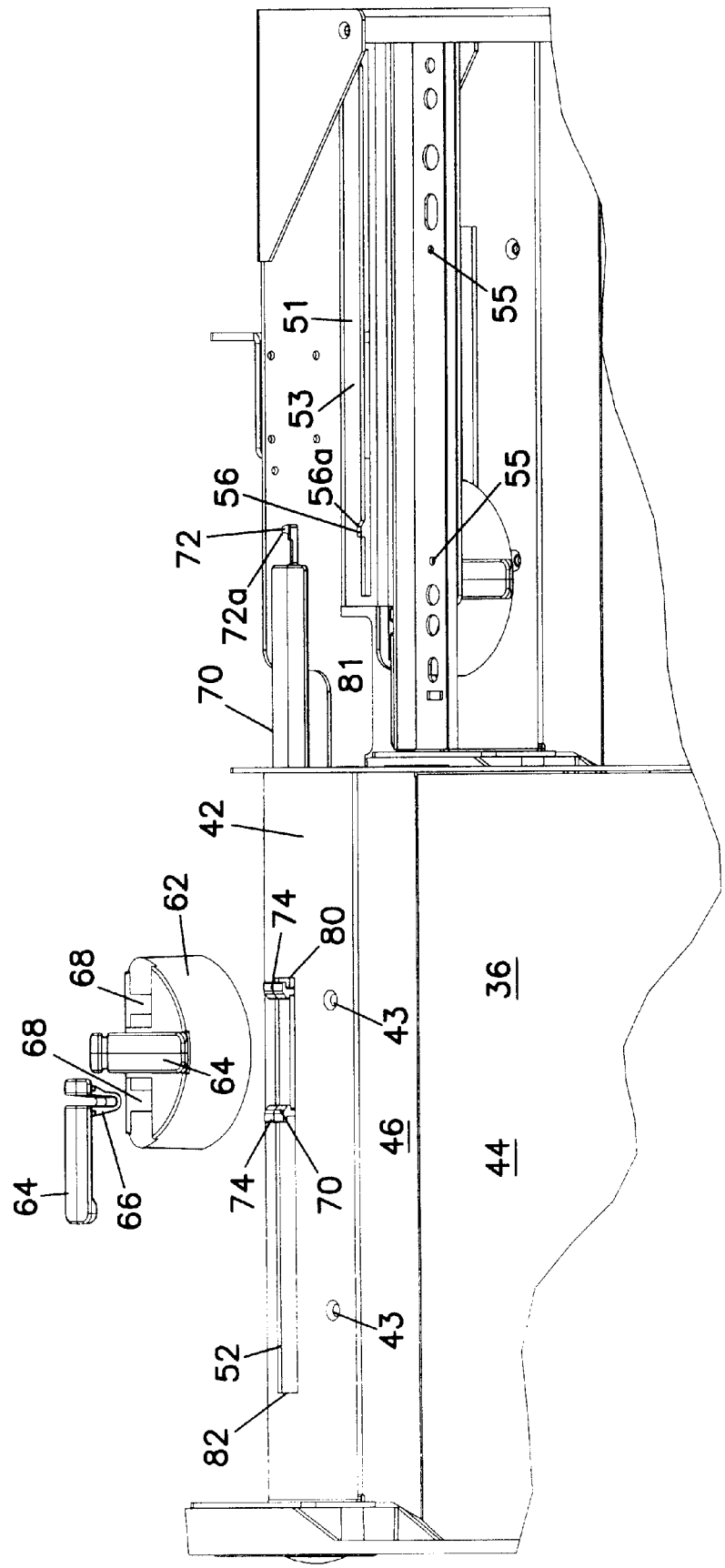
FIG. 4 is a partially exploded view of the left side of the cable management panel as shown in FIG. 3.
Figure 5:
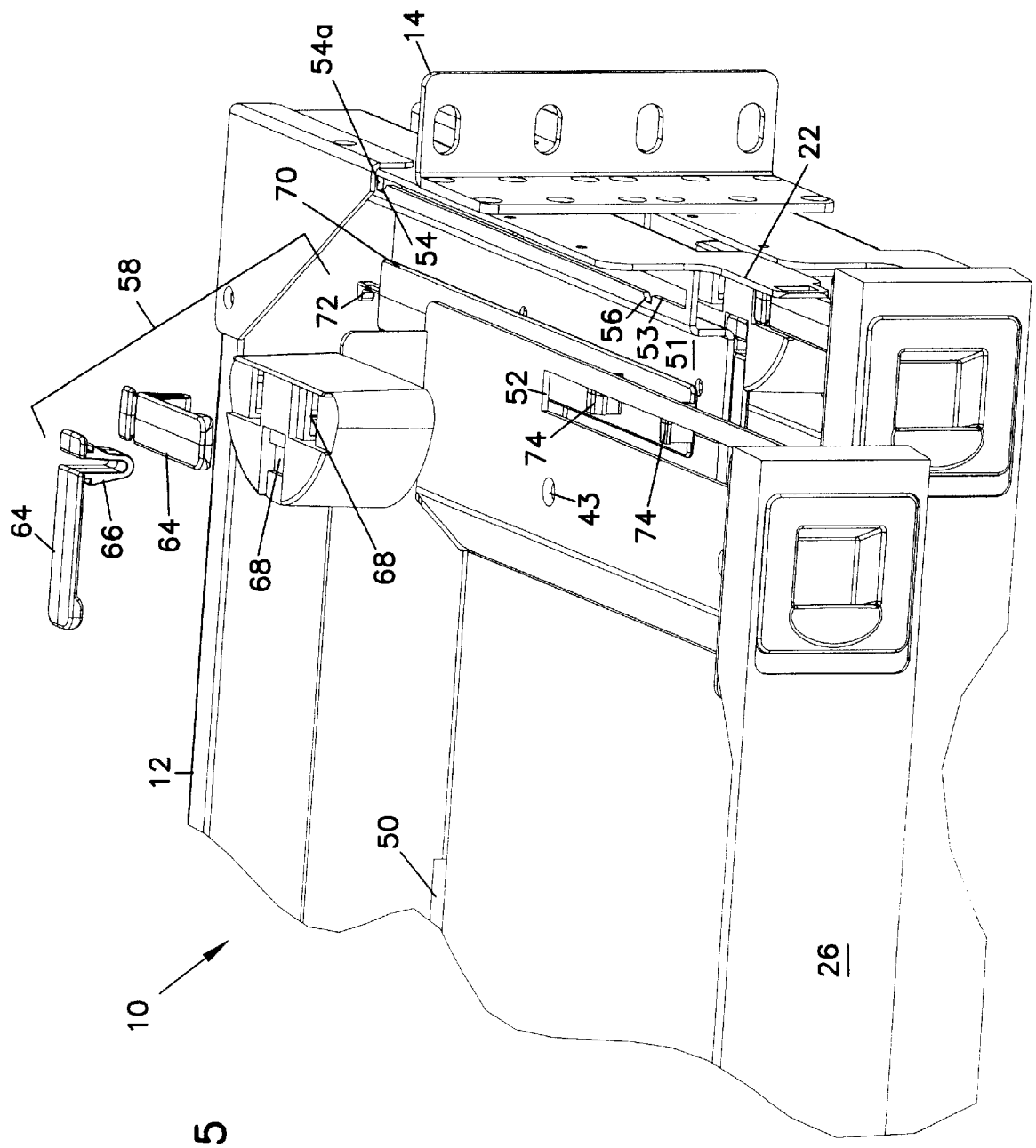
FIG. 5 is a partially exploded perspective view of the right side of the cable management panel of FIG. 1.
Figure 19B:
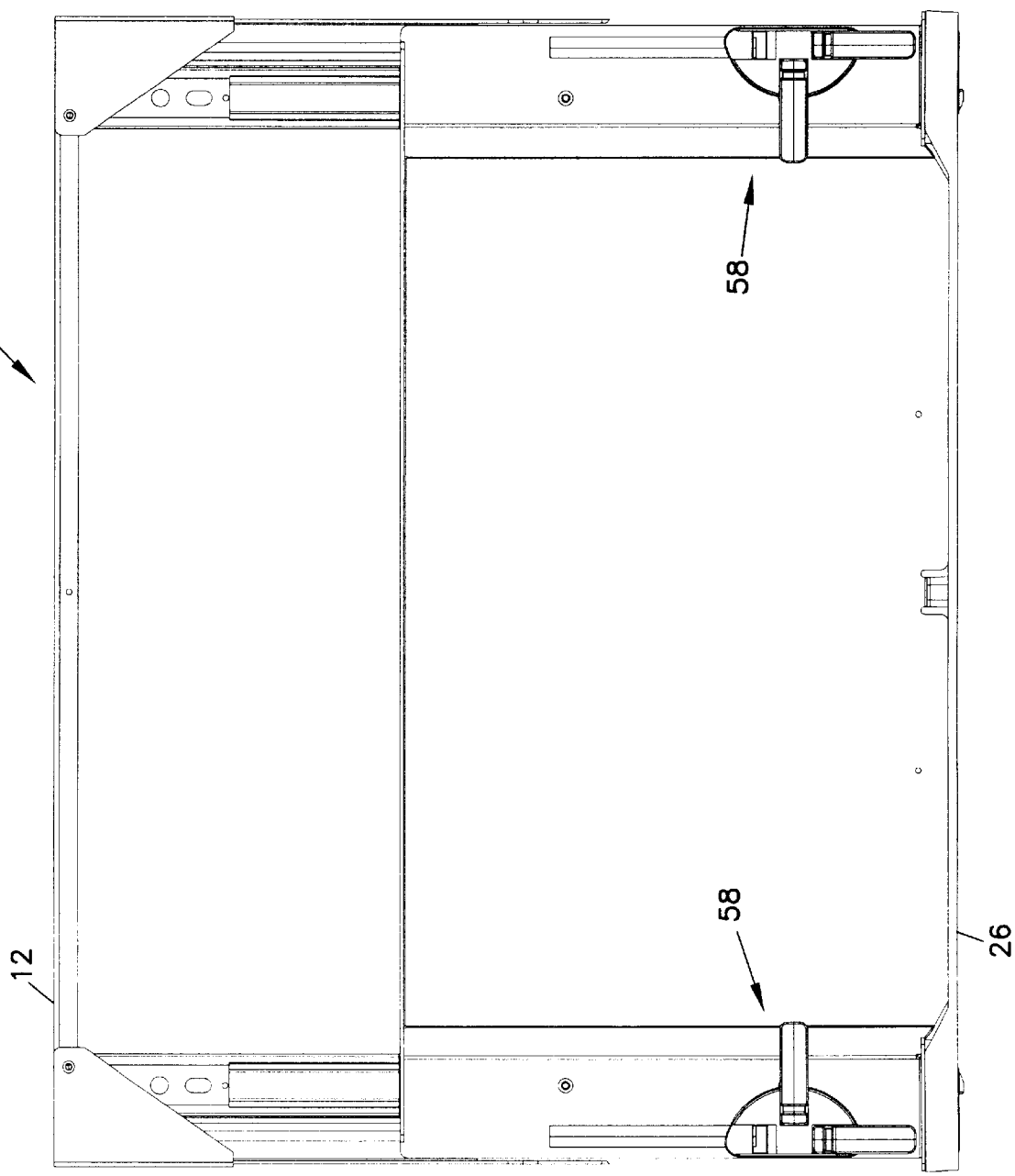
Figure 19C:
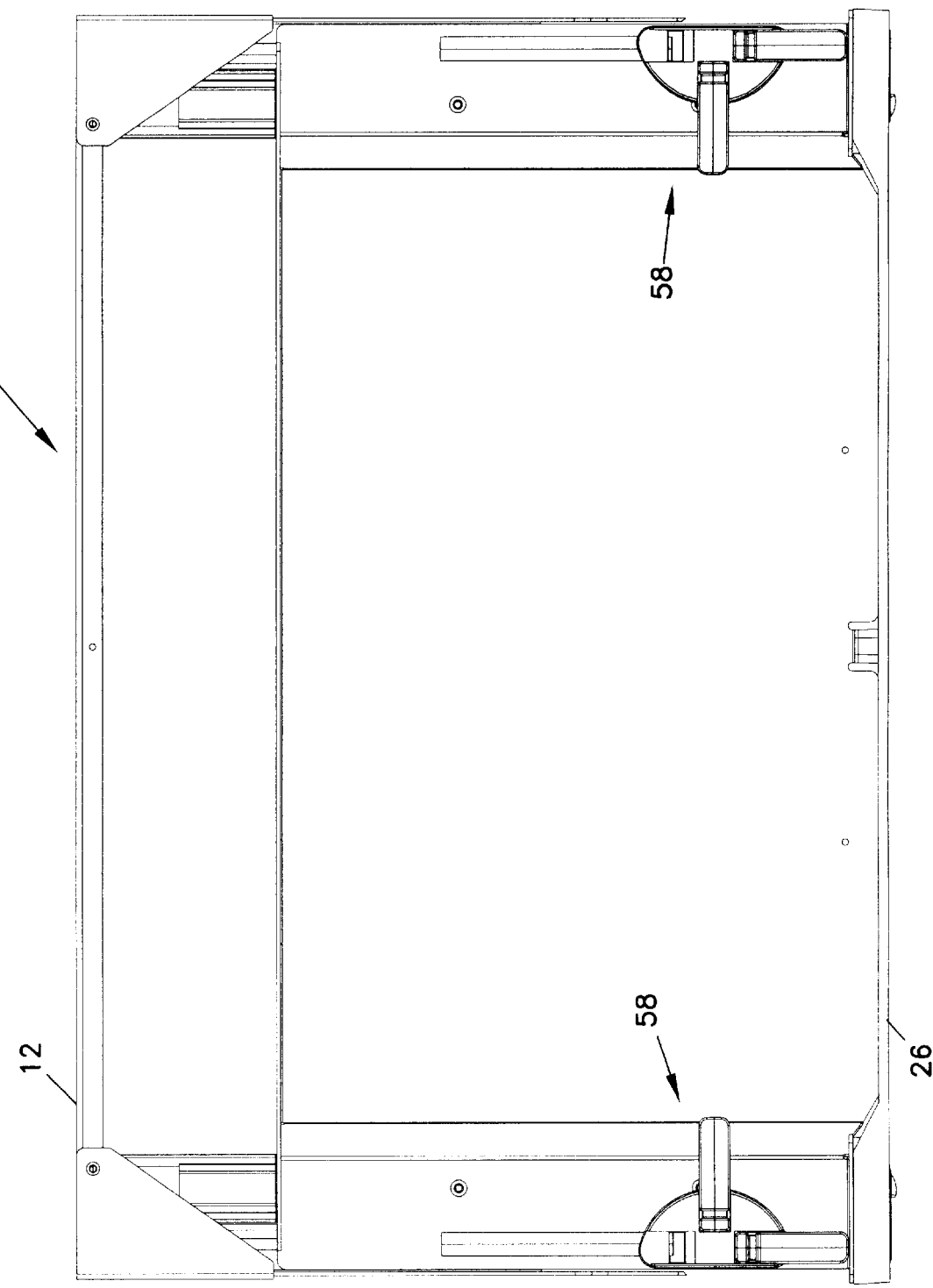
Figure 19D:
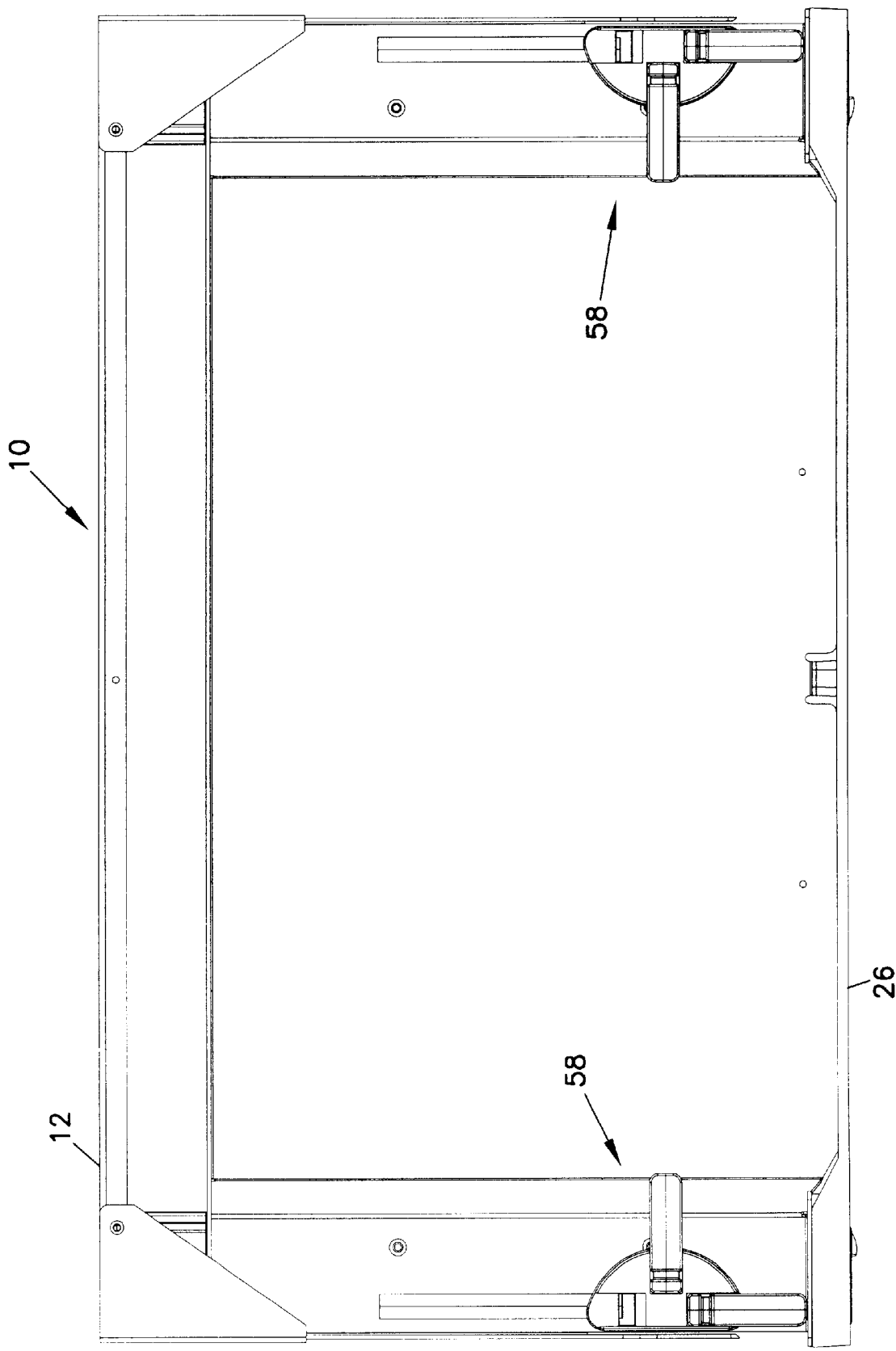

Referring now to FIGS. 19A–D, front notch 56 maintains radius limiter 62 in position relative to chassis 12 while drawer 26 begins rearward movement during closing of drawer 26. As shown in FIGS. 19B and 4, engagement of a front end 82 of slot 52 with the connection between radius limiter 62 and extension 70 causes rearward movement of radius limiter 62 with drawer 26 to the closed position shown in FIG. 18A.

In the example module 10, two take-up mechanisms 58 are provided, one for each side access opening 22. For ease of manufacturing, the same extension 70 and radius limiter 62 are used for each mechanism. Radius limiter 62 is flipped about a vertical axis when used to assemble the take-up mechanism on the opposite side of drawer 26. Tabs 64 are placed in the flipped radius limiter 62 to appropriately retain cables positioned around radius limiter 62. For a similar reason, trays 118 can be mounted on either side of drawer 26. Trays 118 are symmetrical about a center axis 145 The configuration of the interior of drawer 26 can vary as the desired functions for panel 10 vary. The examples of FIGS. 6–17A and B are provided to show some of the variations possible.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A cable management device for mounting to a drawer slideably mounted to a chassis, the drawer including a front key and a rear slot, the drawer further including a base and raised side ledges on opposite sides of the drawer, the cable management device comprising:

a drop-in plate including a notch along a front edge and a tab along a rear edge, the notch engageable with the key of the drawer, the tab engageable with the slot of the drawer;

wherein the plate further includes a base and two side edges which are positioned adjacent to the side ledges of the drawer, the plate including two radius limiters, each radius limiter having a portion extending beyond the respective side edges of the base of the plate, the radius limiter having a notch along a lower edge, the notch extending from each respective side edge of the base of the plate to the side ledge of the drawer.

2. The device of claim 1, wherein the radius limiters include an arcuate portion having a convex surface facing the rear edge of the plate.

3. A cable management panel comprising:
   a chassis;
   a drawer slidably mounted within the chassis, the drawer slideable between a first position with the drawer fully inserted within the chassis and a second position with the drawer extended from the interior of the chassis, the drawer including a front key and a rear slot;
   an access location allowing entry of optical fiber cable into a side of the chassis and the drawer;
   a cable take-up mechanism including a push member slidably mounted on the drawer and movable from a first position on the drawer toward a second position on the drawer which is forward of the first position as the drawer is moved from the second position to the first position, the push member also slideably mounted to the chassis; and
   a drop-in plate including a notch along a front edge, and a tab along a rear edge, the notch engageable with the key of the drawer, the tab engageable with the slot of the drawer.

4. The cable management panel of claim 3, wherein the drawer further includes a base and raised side ledges on opposite sides of the drawer, and wherein the plate includes a base and two side edges which are positioned adjacent to the side ledges of the drawer, the plate including two radius limiters, each radius limiter having a portion extending beyond the respective side edges of the base of the plate, each radius limiter having a notch along a lower edge, the notch extending from each respective side edge of the base of the plate to the side ledge of the drawer.

5. A cable management panel comprising:
   a chassis;
   a drawer slidably mounted within the chassis, the drawer slideable between a first position with the drawer fully inserted within the chassis and a second position with the drawer extended from the interior of the chassis;
   an access location allowing entry of optical fiber cable into a side of the chassis and the drawer; and
   a cable take-up mechanism including a push member slidably mounted on the drawer and movable from a first position on the drawer toward a second position on the drawer which is forward of the first position as the drawer is moved from the second position to the first position, the push member also slideably mounted to the chassis;
   wherein the drawer includes a base and raised side ledges on opposite sides of the drawer, and further including a drop-in plate including a base and two side edges which are positioned adjacent to the side ledges of the drawer, the plate including two radius limiters, each radius limiter having a portion extending beyond the respective side edges of the base of the plate, each radius limiter having a notch along a lower edge, the notch extending from each respective side edge of the base of the plate to the side ledge of the drawer.

6. The cable management panel of claim 5, wherein the radius limiters include an arcuate portion having a convex surface facing the rear edge of the plate.

7. A cable management panel comprising:
   (a) a chassis;
   (b) a drawer slidably mounted within the chassis; the drawer including a front key and a rear slot,
      (i) the drawer being slideable between a first position with the drawer fully inserted within the chassis and a second position with the drawer extended from the interior of the chassis;
      (ii) the chassis and the drawer defining an access location allowing entry of optical fiber cable into a side of the chassis and the drawer;
   (c) a cable take-up mechanism including a push member;
      (i) the push member being slidably mounted on the drawer and movable from a first position on the drawer toward a second position on the drawer which is forward of the first position as the drawer is moved from the second position to the first position;
      (ii) the push member being slideably mounted to the chassis; and
   (d) a drop-in plate including a notch along a front edge, and a tab along a rear edge;
      (i) the notch engageable with the key of the drawer; and
      (ii) the tab engageable with the slot of the drawer.

8. A cable management panel according to claim 7 wherein:
   (a) the cable take-up mechanism further includes a retention member;
      (i) the retention member holding the push member relative to the chassis for a portion of movement of the drawer from the second position toward the first position;
      (ii) the retention member releasing the push member at an intermediate position so as to allow the push member to move relative to the chassis as the drawer is moved from the intermediate position to the first position.

9. A cable management panel according to claim 8 further comprising:
   (a) a second retention member holding the push member relative to the chassis for a portion of movement of the drawer from the first position toward the second position, the second retention member releasing the push member at an intermediate opening position so as to allow the push member to move relative to the chassis as the drawer is moved from the intermediate opening position to the second position.

10. A cable management panel according to claim 7, further comprising:
   (a) a storage tray mount on the drawer, the storage tray mount having a plurality of pairs of opposed, staggered mounting locations, and a plurality of storage trays;
      (i) each storage tray rotatably mounted to the storage tray mount at one of the staggered mounting locations;
      (ii) one of the trays and the tray mount including a post and the other including a hole for receiving the post so as to rotatably mount each tray to the tray mount at each mounting location; and
      (iii) one of the trays and the tray mount including a projection extending parallel to a rotation axis of the tray, and the other includes a notch wherein the projection is received in the notch when each tray is pivoted vertically upwardly from a first horizontal position to a second pivoted position at an angle to the horizontal.

11. A cable management panel comprising:
(a) a chassis;
(b) a drawer slidably mounted within the chassis; the drawer including a base and raised side ledges on opposite sides of the drawer;
  (i) the drawer being slideable between a first position with the drawer fully inserted within the chassis and a second position with the drawer extended from the interior of the chassis;
  (ii) the chassis and the drawer defining an access location allowing entry of optical fiber cable into a side of the chassis and the drawer;
(c) a cable take-up mechanism including a push member;
  (i) the push member being slidably mounted on the drawer and movable from a first position on the drawer toward a second position on the drawer which is forward of the first position as the drawer is moved from the second position to the first position;
  (ii) the push member being slideably mounted to the chassis; and
(d) a drop-in plate including a base and two side edges positioned adjacent to the side ledges of the drawer; the plate including two radius limiters;
  (i) each of the radius limiters having a portion extending beyond the respective side edges of the base of the plate;
  (ii) each of the radius limiters having a notch along a lower edge, the notch extending from each respective side edge of the base of the plate to the side ledge of the drawer.

12. A cable management panel according to claim 11 wherein:
(a) the drawer includes a front key and a rear slot; and
(b) further comprising a drop-in plate including a notch along a front edge, and a tab along a rear edge;
  (i) the notch engageable with the key of the drawer; and
  (ii) the tab engageable with the slot of the drawer.

13. A cable management panel according to claim 11 wherein:
(a) the cable take-up mechanism further includes a retention member;
  (i) the retention member holding the push member relative to the chassis for a portion of movement of the drawer from the second position toward the first position;
  (ii) the retention member releasing the push member at an intermediate position so as to allow the push member to move relative to the chassis as the drawer is moved from the intermediate position to the first position.

14. A cable management panel according to claim 13 further comprising:
(a) a second retention member holding the push member relative to the chassis for a portion of movement of the drawer from the first position toward the second position, the second retention member releasing the push member at an intermediate opening position so as to allow the push member to move relative to the chassis as the drawer is moved from the intermediate opening position to the second position.

15. A cable management panel according to claim 11, further comprising:
(a) a storage tray mount on the drawer, the storage tray mount having a plurality of pairs of opposed, staggered mounting locations, and a plurality of storage trays;
  (i) each storage tray rotatably mounted to the storage tray mount at one of the staggered mounting locations;
  (ii) one of the trays and the tray mount including a post and the other including a hole for receiving the post so as to rotatably mount each tray to the tray mount at each mounting location; and
  (iii) one of the trays and the tray mount including a projection extending parallel to a rotation axis of the tray, and the other includes a notch wherein the projection is received in the notch when each tray is pivoted vertically upwardly from a first horizontal position to a second pivoted position at an angle to the horizontal.

16. A cable management panel comprising:
(a) a chassis;
(b) a drawer slidably mounted within the chassis;
  (i) the drawer being slideable between a first position with the drawer fully inserted within the chassis and a second position with the drawer extended from the interior of the chassis;
  (ii) the chassis and the drawer defining an access location allowing entry of optical fiber cable into a side of the chassis and the drawer;
(c) a cable take-up mechanism including a push member;
  (i) the push member being slidably mounted on the drawer and movable from a first position on the drawer toward a second position on the drawer which is forward of the first position as the drawer is moved from the second position to the first position;
  (ii) the push member being slideably mounted to the chassis; and
  (iii) the push member being curved on one side and planar on an opposite side, the curved side facing inwardly relative to the drawer, the planar side facing outwardly relative to the drawer, the planar side positioned adjacent to the access location.

17. A cable management panel according to claim 16 wherein:
(a) the cable take-up mechanism further includes a retention member;
  (i) the retention member holding the push member relative to the chassis for a portion of movement of the drawer from the second position toward the first position;
  (ii) the retention member releasing the push member at an intermediate position so as to allow the push member to move relative to the chassis as the drawer is moved from the intermediate position to the first position.

18. A cable management panel according to claim 16, further comprising:
(a) a storage tray mount on the drawer, the storage tray mount having a plurality of pairs of opposed, staggered mounting locations, and a plurality of storage trays;
  (i) each storage tray rotatably mounted to the storage tray mount at one of the staggered mounting locations.

19. A cable management panel according to claim 16 wherein:
(a) the drawer includes a front key and a rear slot; and
(b) further comprising a drop-in plate including a notch along a front edge, and a tab along a rear edge;
  (i) the notch engageable with the key of the drawer; and
  (ii) the tab engageable with the slot of the drawer.

20. A cable management panel comprising:
(a) a chassis;
(b) a drawer slidably mounted within the chassis;
  (i) the drawer being slideable between a first position with the drawer fully inserted within the chassis and a second position with the drawer extended from the interior of the chassis;
  (ii) the chassis and the drawer defining a first and second access location; the first access location allowing entry of optical fiber cable into a first side of the chassis and the drawer; and the second access location allowing entry of the optical fiber cable into a second side opposite of the first side;
(c) a first and second cable take-up mechanism each including a push member and being located adjacent to respective first and second sides;
  (i) each push member being slidably mounted on the drawer and movable from a first position on the drawer toward a second position on the drawer which is forward of the first position as the drawer is moved from the second position to the first position;
  (ii) each push member being slideably mounted to the chassis.

21. A cable management panel according to claim 20 further comprising:
(a) a drop-in plate including engagement structure;
  (i) the engagement structure engaging cooperating engagement structure in the drawer.

22. A cable management panel according to claim 20 wherein:
(a) each of the first and second cable take-up mechanism further includes a retention member;
  (i) each retention member holding the respective push member relative to the chassis for a portion of movement of the drawer from the second position toward the first position; and
  (ii) each retention member releasing the respective push member at an intermediate position so as to allow the respective push member to move relative to the chassis as the drawer is moved from the intermediate position to the first position.

23. A cable management panel according to claim 20, further comprising:
(a) a storage tray mount on the drawer, the storage tray mount having a plurality of pairs of opposed, staggered mounting locations, and a plurality of storage trays mounted thereon.

24. A cable management panel comprising:
(a) a chassis; the chassis including a first slot;
  (i) first slot including a longitudinal extension and a side notch;
(b) a drawer slidably mounted within the chassis;
  (i) the drawer being slideable between a first position with the drawer fully inserted within the chassis and a second position with the drawer extended from the interior of the chassis;
  (ii) the chassis and the drawer defining an access location allowing entry of optical fiber cable into a side of the chassis and the drawer;
(c) a cable take-up mechanism including a push member;
  (i) the push member being slidably mounted on the drawer and movable from a first position on the drawer toward a second position on the drawer which is forward of the first position as the drawer is moved from the second position to the first position;
  (ii) the push member being slideably mounted to the chassis;
  (iii) the drawer including a rearward extension extending from the push member; the rearward extension including a flexible tab; the push member positioned above the drawer, the rearward extension positioned below the push member;
    (A) the tab being positioned in the longitudinal extension of the first slot during movement of the push member; and
    (B) the tab being positioned in the side notch during holding of the push member.

25. A cable management panel according to claim 24 wherein:
(a) the cable take-up mechanism further includes a retention member;
  (i) the retention member holding the push member relative to the chassis for a portion of movement of the drawer from the second position toward the first position;
  (ii) the retention member releasing the push member at an intermediate position so as to allow the push member to move relative to the chassis as the drawer is moved from the intermediate position to the first position.

26. A cable management panel according to claim 25 further comprising:
(a) a second retention member holding the push member relative to the chassis for a portion of movement of the drawer from the first position toward the second position, the second retention member releasing the push member at an intermediate opening position so as to allow the push member to move relative to the chassis as the drawer is moved from the intermediate opening position to the second position.

27. A cable management panel according to claim 24 wherein:
(a) the push member is curved on one side and planar on an opposite side, the curved side facing inwardly relative to the drawer, the planar side facing outwardly relative to the drawer, and the planar side positioned adjacent to the access location.

28. A cable management panel according to claim 24 further comprising:
(a) a drop-in plate including engagement structure;
  (i) the engagement structure engaging cooperating engagement structure in the drawer.

29. A cable management panel according to claim 24, further comprising:
(a) a storage tray mount on the drawer, the storage tray mount having a plurality of pairs of opposed, staggered mounting locations, and a plurality of storage trays mounted thereon.

30. A cable management device comprising:
(a) a storage tray mount having a base and two upwardly extending portions defining a plurality of pairs of opposed, staggered mounting locations; each of the mounting locations:
  (i) defining a pair of receiving holes therethrough; and
  (ii) defining a pair of notches therein;
(b) a plurality of storage trays, each storage tray rotatably mounted to the storage tray mount at one of the staggered mounting locations; each of the plurality of trays includes:
  (i) a pair of projections;
    (A) each of the pair of projections having a post extending orthogonally therefrom;

(1) each post being rotatably received within one of the receiving holes to permit selective pivoting of the trays relative to the mount between a horizontal position and a vertical position; and
(B) each of the pair of projections having a retention tab projecting outwardly therefrom and in a same direction as each of the posts;
  (1) each tab selectively engaging one of the notches when a respective tray is pivoted from the horizontal position to a second pivoted position at an angle to the horizontal position; and
  (2) the tab and notch engagement retaining the respective tray in the second pivoted position.

31. A device according to claim 30 wherein:
(a) each storage tray includes a base, a peripheral edge extending up from the base, a center spool extending up from the base, and an end defining a rotation axis;
  (i) the peripheral edge defining two cable access locations through the peripheral edge; and
  (ii) the cable access locations being positioned on opposite sides of the tray at the end of the tray defining the rotation axis.

32. A device according to claim 31 wherein:
(a) each tray is symmetrical about a center axis extending from the end toward an opposite free end.

33. A device according to claim 30 further comprising:
(a) a chassis;
(b) a drawer slidably mounted within the chassis, the drawer being slideable between a first position with the drawer fully inserted within the chassis and a second position with the drawer extended from the interior of the chassis, the drawer having a horizontal base portion;
  (i) the chassis and the drawer defining an access location to allow entry of fiber optic cable into the chassis and the drawer; and
(c) the storage tray mount being located on the horizontal base portion of the drawer.

* * * * *